United States Patent
Ma et al.

(10) Patent No.: US 7,261,418 B2
(45) Date of Patent: Aug. 28, 2007

(54) PROJECTION APPARATUS

(75) Inventors: Jiaying Ma, Maplewood, MN (US); David J. Aastuen, Shoreview, MN (US); Charles L. Bruzzone, Woodbury, MN (US); William W. Merrill, White Bear Lake, MN (US); Timothy J. Hebrink, Oakdale, MN (US); Harry E. Johnson, Hudson, WI (US); Fuming B. Li, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 10/987,528

(22) Filed: Nov. 12, 2004

(65) Prior Publication Data

US 2006/0103810 A1    May 18, 2006

(51) Int. Cl.
    *G03B 21/14*  (2006.01)
(52) U.S. Cl. ............................. 353/20; 353/34; 349/9
(58) Field of Classification Search ............. 353/20, 353/31, 33, 34, 37; 349/5, 7, 8, 9
    See application file for complete search history.

(56) References Cited

U.S. PATENT DOCUMENTS

| | | | |
|---|---|---|---|
| 5,094,788 A | 3/1992 | Schrenk et al. | |
| 5,094,793 A | 3/1992 | Schrenk et al. | |
| 5,751,384 A | 5/1998 | Sharp | |
| 5,808,794 A | 9/1998 | Weber et al. | |
| 5,882,774 A * | 3/1999 | Jonza et al. | 428/212 |
| 5,912,762 A | 6/1999 | Li et al. | |
| 5,946,056 A | 8/1999 | Ishibashi et al. | |
| 5,953,083 A | 9/1999 | Sharp | |
| 5,976,424 A | 11/1999 | Weber et al. | |
| 6,088,159 A | 7/2000 | Weber et al. | |
| 6,111,697 A | 8/2000 | Merrill et al. | |
| 6,183,091 B1 | 2/2001 | Johnson et al. | |
| 6,190,014 B1 | 2/2001 | Kusano et al. | |
| 6,310,673 B1 | 10/2001 | Sharp | |
| 6,390,626 B2 | 5/2002 | Knox | |
| 6,447,120 B1 | 9/2002 | Hansen et al. | |
| 6,449,092 B1 | 9/2002 | Weber et al. | |

(Continued)

FOREIGN PATENT DOCUMENTS

WO    WO99/36262    7/1999

(Continued)

OTHER PUBLICATIONS

Michael G. Robinson et al., High Contrast Color Splitting Architecture Using Color Polarization Filters, SID '00 Digest, vol. 31, p. 92, Apr. 2000.

*Primary Examiner*—William C. Dowling
(74) *Attorney, Agent, or Firm*—George W. Jonas

(57) ABSTRACT

A projection engine uses a first polarizing beam splitter (PBS) that substantially reflects light incident along a first input direction in a first polarization state and substantially transmits light incident in the first input direction in a second polarization state orthogonal to the first polarization state. The first PBS demonstrates an angularly dependent reflectivity for light in the second polarization state that is asymmetric about the first input direction. At least two imager devices are positioned to receive light reflected and transmitted by the first PBS respectively. The imager devices modulate the incident light with an image. The image light from the imagers is combined and projected.

31 Claims, 13 Drawing Sheets

U.S. PATENT DOCUMENTS

| | | | |
|---|---|---|---|
| 6,449,093 | B2 | 9/2002 | Hebrink et al. |
| 6,486,997 | B1 | 11/2002 | Bruzzone et al. |
| 6,574,045 | B2 | 6/2003 | Hebrink et al. |
| 6,609,795 | B2 | 8/2003 | Weber et al. |
| 6,648,474 | B2 * | 11/2003 | Katsumata et al. ........... 353/20 |
| 6,721,096 | B2 | 4/2004 | Bruzzone et al. |
| 6,803,972 | B1 | 10/2004 | Budd et al. |
| 6,857,747 | B2 * | 2/2005 | Pentico et al. ................ 353/31 |
| 6,893,130 | B2 * | 5/2005 | Pentico et al. ................ 353/31 |
| 6,961,179 | B2 * | 11/2005 | Chen et al. ................ 359/485 |
| 6,972,810 | B2 * | 12/2005 | Magarill et al. ............... 349/8 |
| 2002/0005986 | A1 | 1/2002 | Hebrink et al. |
| 2002/0154420 | A1 | 10/2002 | Magarill et al. |
| 2003/0016334 | A1 | 1/2003 | Weber et al. |
| 2003/0072931 | A1 | 4/2003 | Hebrink et al. |
| 2003/0147051 | A1 * | 8/2003 | Fujita et al. .................. 353/31 |
| 2004/0189950 | A1 * | 9/2004 | Suzuki et al. ................ 353/20 |
| 2004/0227994 | A1 | 11/2004 | Ma et al. |
| 2005/0046759 | A1 * | 3/2005 | O'Donnell et al. ............ 349/5 |
| 2006/0028620 | A1 * | 2/2006 | Conner ........................ 353/20 |

FOREIGN PATENT DOCUMENTS

WO     WO 01/73485 A1    10/2001

* cited by examiner

—●— Z index 50 % CoPET F / 50% PCTG 122-E2 top
- ◆ - Z index of 30/70 CoPEN 122-F4-50 top
—▲— Z index of 30/70 CoPEN 122-F4-50 bot

PROJECTION APPARATUS

FIELD OF THE INVENTION

The present invention is directed generally to projection systems, and more particularly to reflective projection systems.

BACKGROUND OF THE INVENTION

Optical projection systems typically include a transmissive or a reflective imager, also referred to as a light valve or light valve array, which imposes an image on a light beam. Reflective light valves modulate only selected portions of the input beam to form an image, and provide important advantages over transmissive light valves. For example, reflective light valves permit controlling circuitry to be placed behind the reflective surface, and more advanced integrated circuit technology is available because the substrate materials are not limited by their opaqueness.

Many reflective liquid crystal display (LCD) imagers rotate the polarization of incident light. Thus, polarized light is either reflected by the imager with its polarization state substantially unmodified, or with a degree of polarization rotation imparted to provide a desired grey scale. Accordingly, a polarized light beam is generally used as the input beam for reflective LCD imagers. A desirable compact arrangement includes a folded light path between a polarizing beamsplitter (PBS) and the imager, wherein the illuminating beam and the projected image reflected from the imager share the same physical space between the PBS and the imager. The PBS separates the incoming light from the polarization-rotated image light. A single imager may be used for forming a monochromatic image or may also be used for forming a color image when the single imager is illuminated with light whose color is temporally varied. Multiple imagers may be used for forming a color image, where the illuminating light is split into multiple beams of different color, for example red, green and blue. An image is imposed on each of the colored beams individually by respective imagers, and the differently colored image beams are then recombined to form a full color image beam.

It is desirable to use as much light generated by the light source as possible. Where the light source generates light over a wide angle, such as an arc lamp, more light can be passed through the imager system using low f-number optics. A problem, termed "polarization cascade" and associated with a conventional PBS that relies on Brewster effects to polarize the light, places a lower limit on the f-number of the illumination optics of traditional optical imaging systems. A conventional PBS used in a projector system, sometimes referred to as a MacNeille PBS, uses a stack of inorganic dielectric films placed at Brewster's angle. Light having s-polarization is reflected, while light in the p-polarization state is transmitted through the polarizer. However, wide angle performance is difficult to achieve using these polarizers, since the Brewster angle condition for a pair of materials is strictly met at only one angle of incidence. As the angle of incidence deviates from Brewster's angle, a spectrally non-uniform leak develops. Furthermore, there are contrast disadvantages for a folded light path projector associated with the use of p- and s-polarization.

Since light in a projection system is generally projected as a cone, most of the rays of light are not perfectly incident on the polarizer at Brewster's angle, resulting in depolarization of the light beam. The amount of depolarization increases as the system f-number decreases, and is magnified in subsequent reflections from color selective films, for example as might be found in a color-separating prism. It is recognized that the problem of depolarization cascade effectively limits the f-number of the projection system, thereby limiting the light throughput efficiency.

SUMMARY OF THE INVENTION

One exemplary embodiment of the present disclosure is directed to a projection engine device that comprises a first polarizing beam splitter (PBS) that substantially reflects light incident along a first input direction in a first polarization state and substantially transmits light incident in the first input direction in a second polarization state orthogonal to the first polarization state. The first PBS demonstrates an angularly dependent reflectivity for light in the second polarization state that is asymmetric about the first input direction. A second PBS is positioned to receive light reflected by the first PBS and a third PBS is positioned to receive light transmitted through the first PBS. A first imaging element is configured and arranged to a) receive, as first incident light, at least a first portion of the light received by the second PBS from the first PBS; b) polarization modulate at least a portion of the first incident light from the first polarization state to the second polarization state or from the second polarization state to the first polarization state; and c) reflect the polarization modulated light back to the second PBS as first image light. A second imaging element is configured and arranged to a) receive, as second incident light, at least a first portion of the light received by the third PBS from the first PBS; b) polarization modulate at least a portion of the second incident light from the first polarization state to the second polarization state or from the second polarization state to the first polarization state; and c) reflect the polarization modulated light back to the third PBS as second image light. A combiner is positioned to receive the first and second image light from the second and third PBSs, respectively.

Another exemplary embodiment of the present disclosure is directed to a projection engine device that includes a first polarizing beam splitter (PBS). The first PBS substantially reflects light incident along a first input direction in a first polarization state and substantially transmits light incident in the first input direction in a second polarization state orthogonal to the first polarization state. The first PBS has an angularly dependent reflectivity for light in the second polarization state that is asymmetric about the first input direction. At least a first imaging device is configured and arranged to impose an image on light reflected by the first PBS. At least a second imaging device is configured and arranged to impose an image on light transmitted through the first PBS. A combining element is disposed to combine image light received from the at least a first imaging device and the at least a second imaging device to form a combined image beam.

The above summary is not intended to describe each disclosed embodiment or every implementation of the present disclosure. The following figures and detailed description more particularly exemplify these embodiments.

BRIEF DESCRIPTION OF THE DRAWINGS

The disclosure may be more completely understood in consideration of the following detailed description of various embodiments in connection with the accompanying drawings, in which.

Figure 1:
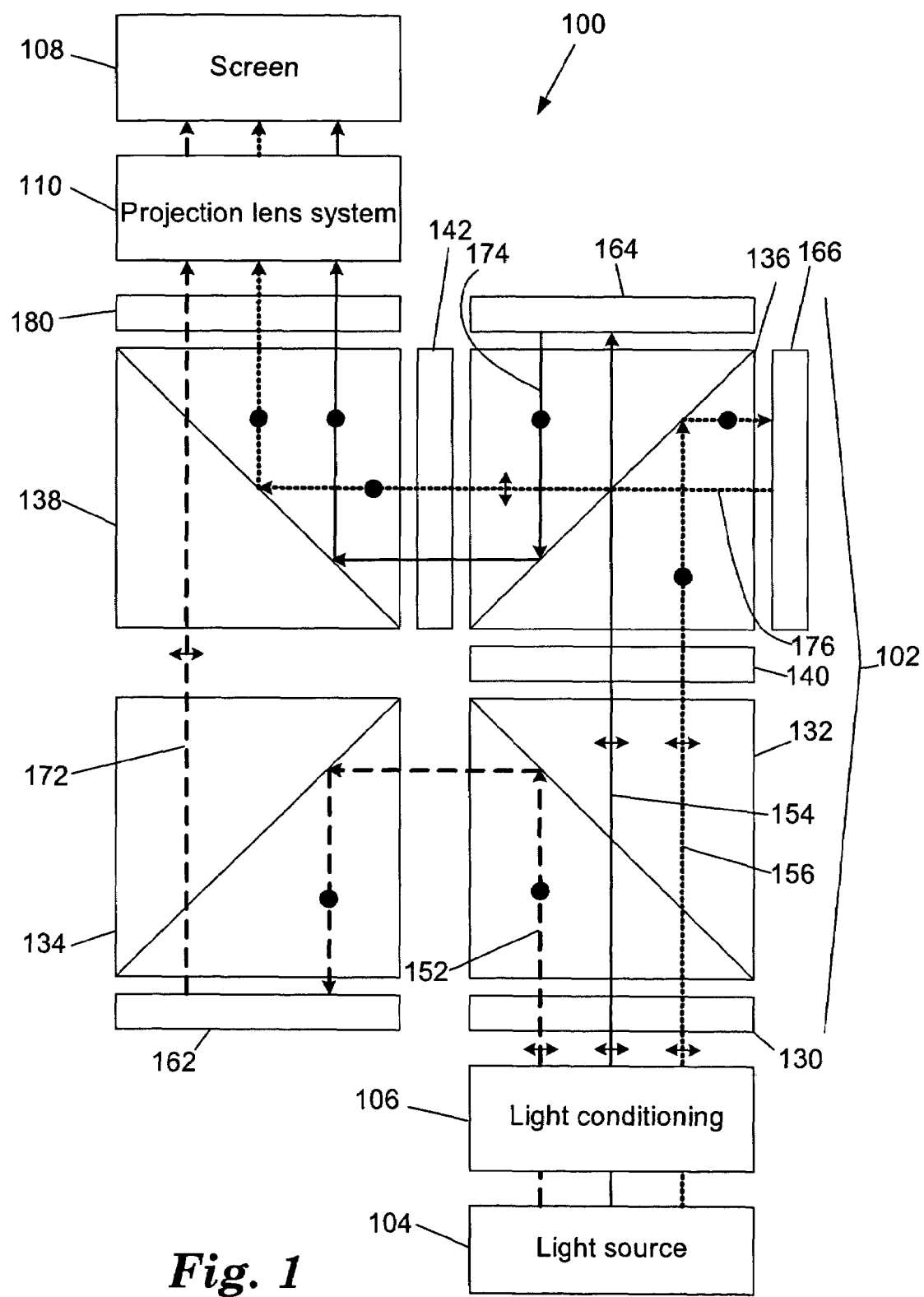
FIG. 1 schematically illustrates an exemplary embodiment of a projection system according to principles of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the present disclosure.

DETAILED DESCRIPTION

The present disclosure is believed to be applicable to projection systems. In particular, the present disclosure is directed to projection engines having at least one polarizing beam splitter (PBS) that is highly transmissive of one polarization of light, a projection apparatus that contains the projection engine, and methods of making and using the projection engines and projection apparatus. While the present disclosure is not so limited, an appreciation of various aspects of the disclosure will be gained through a discussion of the examples provided below.

FIG. 1 illustrates one particular exemplary embodiment of a projection engine 102 for use in a projection apparatus 100. The projection engine 102 includes those components that are used to impose an image on an incident beam of light and to produce an output image beam.

In addition to the projection engine 102, the projection apparatus may include a light source 104, light beam conditioning optics 106, a display screen 108, and an optional projection lens system 110. Any display screen 108 and suitable projection lens system 110 may be used. The light source 104 can be any suitable light source including conventional light sources such as, for example, arc lamps, tungsten lamps, halide lamps and the like. In some exemplary embodiments, the light source may include light emitting diodes (LEDs).

Light is provided by the light source 104 and conditioned by the conditioning optics 106 before illuminating the projection engine 102. The conditioning optics 106 change the characteristics of the light emitted by the light source 104 to characteristics that are desirable for use by the projection system 100. For example, the light beam conditioning optics 106 may alter the divergence of the light, the polarization state of the light, the spectrum of the light, or any combination of these characteristics. The conditioning optics 106 can include, for example, one or more lenses to change the divergence of the light, a polarization converter and/or a pre-polarizer to provide light in a particular polarization state, and/or a filter to remove unwanted ultraviolet and/or infrared light, or any combination of these components. In addition, the conditioning optics 106 may also include an integrator, such as a tunnel integrator, to uniformize the intensity of the light across the light beam delivered to the projection engine 102.

In some exemplary embodiments, the conditioning optics 106 may have a low f-number, for example equal to or less than 2.5, so as to produce a low f-number illumination beam. A low f-number illumination beam uses a greater fraction of the light from the light source 104, and leads to more efficient use of the light from the light source 104. In some exemplary embodiments, the conditioning optics 106 can alter the polarization of the light to a first polarization state. This can be accomplished using, for example, a polarizer such as a reflective polarizer or absorbing polarizer. The light can be further filtered to provide light in one or more color bands such as, for example, red, green, and blue color bands. In the illustrated exemplary embodiment, light in three color bands is shown as solid, dashed and dotted lines. These lines are drawn separated from each other: this separation is for reasons of explanation only and, in a real projection system, the light in the three color bands overlaps. In the illustrated exemplary embodiment, the polarization of light emitted from the light conditioning optics 106 is parallel to the plane of the figure, as shown by the double-headed arrow.

The projection engine 102 receives light from the conditioning optics 106. In the illustrated exemplary embodiment, the polarization of light emitted from the light conditioning optics 106 is parallel to the plane of the figure, as shown by the double-headed arrow. A first polarization rotator 130 may rotate the polarization of light for one or more of, but not all of, the color bands to a second polarization state that is orthogonal to the first polarization state. In the illustrated exemplary embodiment, the first polarization rotator 130 rotates the polarization of the light 152 in the first color band to the second polarization state. The second polarization state lies perpendicular to the plane of the figure, as is shown by the black circle. The light in the second color band 154, and in the third color band 156, remains in the first polarization state upon passing through the first polarization rotator 130. Examples of suitable polarization rotators are described in U.S. Pat. No. 5,751,384 and Robinson et al., *SID '00 Digest,* 31, 92 (2000), both of which are incorporated herein by reference.

In an illustrative example, the first color band is green light, for example, light in the wavelength band ranging from about 500 nm to about 600 nm, the second color band is blue light, for example light in the wavelength band ranging from about 420 nm to about 500 nm, and the third color band is red light, for example light in the wavelength band ranging from about 600 nm to about 700 nm. The color bands, in turn, may include different colors.

After the first polarization rotator 130, the light encounters a first polarizing beam splitter (PBS) 132. Light 152 in the first color band is reflected by the first PBS 132 and light 154, 156 in the second and third color bands substantially passes through the first PBS 132.

The light 152 in the first color band, in the second polarization state, is directed by the first PBS 132 towards a second PBS 134. The second PBS 134 reflects the light towards a first imager 162. The first imager 162 is controlled so that the light 152 of the first color band is selectively modulated by the first imager 162 for the desired image for that first color band. The resulting image light 172 in the first color band is reflected from the first imager 162, through the second PBS 134 and is directed to a combiner 138. The combiner may be, for example, a dichroic combiner or a PBS. The image light 172 passes through the combiner 138 to the optional projection lens system 110 and display screen 108. The image light 172 may pass through an optional filter or polarization rotator 180.

After transmission through the first polarizing beam splitter 132, the light 154, 156 in the second and third color bands propagates towards a second polarization rotator 140. The polarization of light 156 of the third color band has its polarization rotated to the second polarization state by the second polarization rotator 140 and the polarization state of light 154 of the second color band remains substantially in the first polarization state. Light 154, 156 is then directed to a third PBS 136 which reflects light in the second polarization state and transmits light in the first polarization state.

Light 154 of the second color band is transmitted through the third PBS 136 to a second imager 164. The second imager 164 is controlled so that the light 154 of the second color band is selectively modulated by the imager 164 to produce a desired image for the second color band. The image light 174 in the second color band is reflected from the second imager 164 and is reflected by the third PBS 136 to the combiner 138. The combiner 138 reflects the image light 174 in the second color band to the projection lens system 110 and the display screen 108.

Light 156 of the third color band is reflected by the third PBS 136 to a third imager 166. The third imager 166 is controlled so that the light 156 of the third color band is selectively modulated by the imager 166 so as to produce a desired image for the third color band. The image light 176 in the third color band is then directed through the third PBS 136 to the combiner 138. The image light 174 and 176 in the second and third color bands pass through a polarization rotator 142 that rotates the polarization of the image light 176 in the third color band to the second polarization state. In the illustrated embodiment, the polarization rotator 142 does not rotate the polarization of the image light 174 in the second color band. Thus, the combiner PBS 138 directs the image light 174 and 176 in the second and third color bands to the projection lens system 110 and to the projection screen 108.

Previously, MacNeille polarizing beamsplitters have been used for each of the polarizing beam splitters 132, 134, 136, and the combiner 138. MacNeille PBSs use a number of refractive index interfaces set at Brewster's angle to the incident light beam. The p-polarized light is transmitted through the PBS with a relatively high loss. The s-polarized light suffers multiple reflections upon passing through the refractive index interfaces. The thicknesses of the different layers of the MacNeille PBS are selected so that the light reflected at each of the interfaces adds constructively, to produce a mostly s-polarized reflected beam. The polarizing performance of the MacNeille PBS is limited since the refractive interfaces lie at Brewster's angle for only one direction of light. Consequently, the ability to polarize the light is diminished when illuminated by a cone of light incident over a range of angles. Furthermore, the polarizing capability reduces as the cone angle increases. Thus, the MacNeille PBS is better suited for systems when illuminated by light having a relatively high f-number, for example f/4 or above. The capability of the MacNeille PBS is reduced when the f-number is reduced, for example at about f/2.5 or less.

It is useful to define the first polarization state as being p-polarization (parallel to the plane of the reflection of the PBSs 132, 134, 136 and combiner 138) and the second polarization state as being s-polarization (perpendicular to the plane of reflection of the PBSs 132, 134, 136 and combiner 138). If the transmission of p-polarized light in the first PBS 132 is given as Tp1 and the transmission of p-polarized light in the other PBSs 134, 136 and combiner 138 is taken as Tp2, the total amount of light, L2d, in the second color band, the blue color band in the example described above, leaking to the projection lens system 110 in the dark state may be given by:

$$L2d = (1-Tp2)Tp2[(1-Tp1)Tp2 + 2(1-Tp2)Tp1] \quad (1)$$

For a MacNeille PBS operating with f/2.5 illumination light, the values of Tp1 and Tp2 are both about 0.88, which results in a maximum contrast for light in the second color band of about 23:1. The value of Tp increases, when the illumination light has a higher f-number, but this is at the expense of lower light collection efficiency from the light source. For example, at f/3.0, the value of Tp may be up to 0.9, which results in a contrast value of 33:1.

Likewise, the amount of light, L3d, leaking in the dark state for the third color band, the red color band in the example provided above, is given by the expression:

$$L3d = (1-Tp1)(1-Tp2)(Tp2)^2 \quad (2)$$

The resulting contrast is higher, for example is about 100:1 for Tp1=Tp2=0.9 at f/2.5.

Consequently, the projection engine 102 has a rather low contrast in the second and third color bands (blue and red light), which is due mainly to the high value of p-polarization reflection by the MacNeille PBSs. This results in the dark state being bluish and reddish, which may be objectionable to the viewer. It is preferable to use elements providing an increased value of Tp1 and Tp2. However, with a MacNeille PBS, a high value of Tp leads to a low extinction ratio. It is especially important that the extinction ratio of the first PBS 132 be high so as to prevent light in the first color band leaking into the channels for the third color band, as this would lead to a color shift in the light beam 156 related to the third color band.

Figure 2:
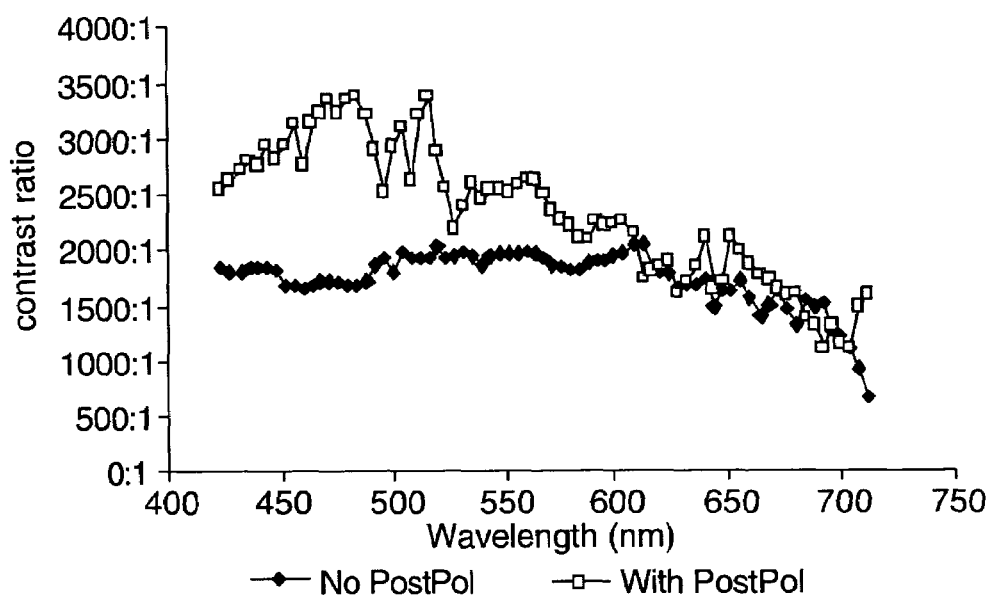
FIG. 2 presents a graph showing the contrast ratio obtained with one type of multilayer optical film (MOF) PBS.

A Cartesian PBS, as compared with a MacNeille PBS, has high Tp combined with high contrast. An example of the dynamic range of light polarized by a Cartesian PBS based on multiple polymer layers is presented in FIG. 2. The contrast ratio remains above 1000 over the visible range from about 400 nm to about 700 nm. Significantly, the value of Tp in the Cartesian PBS is different from that of a MacNeille PBS. The contrast ratio is the ratio of the transmittance of light polarized parallel the pass state of the polarizer over the transmittance of light polarized perpendicular to the pass state of the polarizer.

The first PBS 132 and, optionally, the second PBS 134 are Cartesian PBSs, with the remaining beam splitter 136 and combiner 138 being MacNeille or Cartesian PBSs. The percentage transmission for light polarized in the transmitted state, Tp, may be higher for a Cartesian PBS, at an f-number of f/2.5 or less, than with a MacNeille PBS. Operation with low f-number light sources permits increased illumination efficiency from the light source.

A Cartesian PBS does not rely on incidence at Brewster's angle to reduce the reflection of light in the s-polarization state. Instead, the Cartesian PBS relies on an interaction between the light, in a given polarization state, and a physical characteristic of the polarizer itself that has a value dependent on the polarization of the light relative to an axis of the material itself. Examples of Cartesian PBS include wire grid polarizers and multilayer optical film (MOF) polarizers. In a wire grid polarizer, the light whose polarization is parallel to the wires of the grid is mostly reflected, while the light whose polarization is perpendicular to the wires of the grid is mostly transmitted. Thus, whether light is transmitted or reflected depends not on whether polarization is parallel or perpendicular to the plane of incidence, but depends on the orientation of the polarization relative to the wires of the wire grid.

Figure 3A:
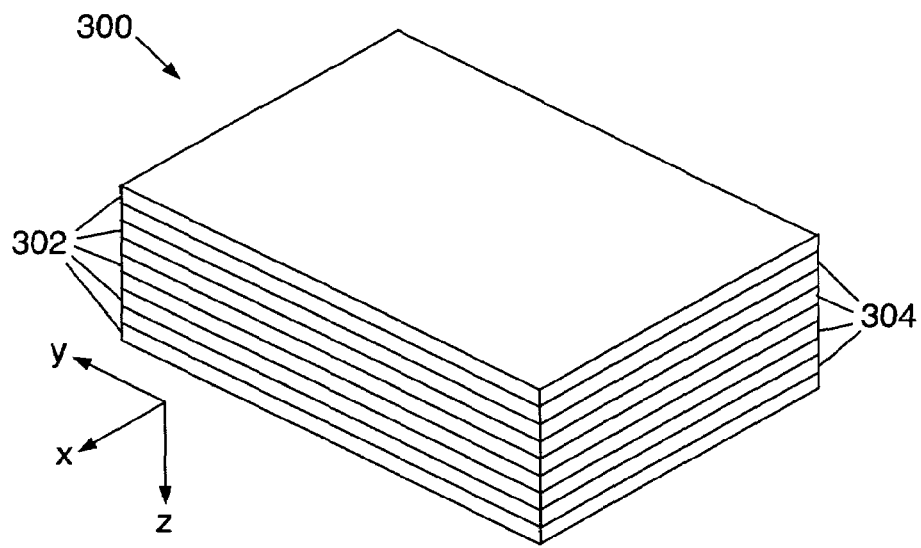
FIG. 3A schematically illustrates an MOF.

An MOF Cartesian PBS comprises a film 300 of hundreds of layers of alternating materials, as is schematically illustrated in FIG. 3. One of the material layers 302 is referred to as the high refractive index (high n) layer and the other material layer 304 is referred to as the low refractive index (low n) layer. Refractive indices, $n_x$, $n_y$' and $n_z$, are defined for each of layers 302 and 304 in three dimensions, for light having an electric field component parallel to the x-, y-, and z-axes respectively.

In one particular configuration, the values of the z-refractive indices, $n_z$, are substantially matched and the values of the x-refractive indices, $n_x$, are also substantially matched. Where the subscript "h" refers to the high n layer 302 and the subscript "l" refers to the low n layer 304, these relationships may be written as: $n_{zh} \approx n_{zl}$ and $n_{xh} \approx n_{xl}$. The values of $n_y$, however, are not matched, i.e. $n_{yh} \neq n_{yl}$. Commonly, the x-direction corresponds to the machine direction (MD) in which the polymer films were pulled when being manufactured, and the y-direction corresponds to the cross-web direction in which the film was stretched in a tentering process (TD—tenter direction). As a result of this mismatch in the refractive index for light polarized parallel to the y-direction, the film acts as a reflective polarizer, substantially reflecting light polarized parallel to the y-direction and substantially transmitting light polarized in the x-direction. Thus, whether the MOF PBS transmits or reflects light depends on the relative orientation of the light's polarization to the x-axis and y-axis of the MOF layer, rather than relying on Brewster's angle as with the MacNeille PBS.

It will be appreciated that other configurations of MOF are possible, for example, where $n_{xh} \neq n_{xl}$, and $n_{zh} \approx n_{zl}$ and $n_{yh} \approx n_{yl}$. For the remainder of this discussion, however, it will be assumed that $n_{zh} \approx n_{zl}$, $n_{xh} \approx n_{xl}$, and $n_{yh} \neq n_{yl}$.

Figure 3B:
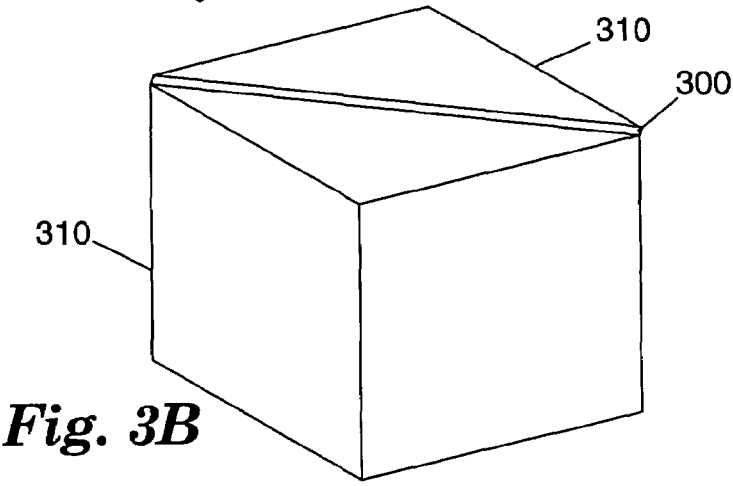
FIG. 3B schematically illustrates an MOF PBS.

The multiple layer film 300 is often positioned between two right-angle, glass prisms 310, as is schematically illustrated in FIG. 3B. High values of Tp, approximately 95% or more, are achieved when $n_{xl}$, and $n_{xh}$, are close in value, as is discussed below.

The materials used in the high n layer 302 and in the low n layer 304 may have closely matched in-plane refractive indices for one polarization state, e.g. for x-polarized light. In-plane refractive indices are those for light polarized parallel to the plane of the films, i.e. the x-y plane. It is common, however, for the two materials to have different values of dispersion, which means that the variation of the refractive index with wavelength is different for the different materials. Thus, where the dispersion of the two materials is different, and if $n_{xh}$ is exactly equal to $n_{xl}$ at for one wavelength, then there is a difference, albeit small, between $n_{xh}$ and $n_{xl}$ at other wavelengths. It is useful, therefore, to set $n_{xh} = n_{xl}$ for a wavelength in the band of wavelengths of interest, and more preferably for a wavelength close to the center of the band of wavelengths. Thus, where the PBS is used with light that covers the entire visible range, e.g. about 400 nm to about 700 nm, then is it useful to set $n_{xh} = n_{xl}$ for a wavelength in the region of about 550 nm. This reduces the size of the refractive index differences between $n_{xh}$ and $n_{xl}$ at the red end and blue end of the visible range.

In a MOF PBS, oriented so as to substantially transmit p-polarized light and reflect s-polarized light, there remains a small amount of p-polarized light that is reflected. This is revealed in consideration of FIG. 4, which shows the measured transmittance through one MOF PBS as a function of wavelength, for light incident at a number of different angles. The MOF PBS was designed primarily for use with visible light incident at an angle of 45°. The transmission of the MOF PBS for light at an incident angle of 45° is shown as curve 402. For light incident at angles of 41° and 35° (curves 404 and 406 respectively), the transmitted spectrum is qualitatively the same as that for light incident at 45°. For light incident at angles higher than 45°, however, the spectrum of the transmitted light changes. At 49° (curve 408), there is a small dip in the transmission at a wavelength of around 616 nm: this corresponds to an increase in the reflected light, centered around 616 nm, at 49° incidence. At 53° incidence (curve 410), the transmission dip, corresponding to peak reflection, is centered at about 536 nm, and at 55° incidence (curve 412), is centered at about 490 nm. Furthermore, the amount of light reflected increases when the incident angle is increased above 45°.

Figure 5:
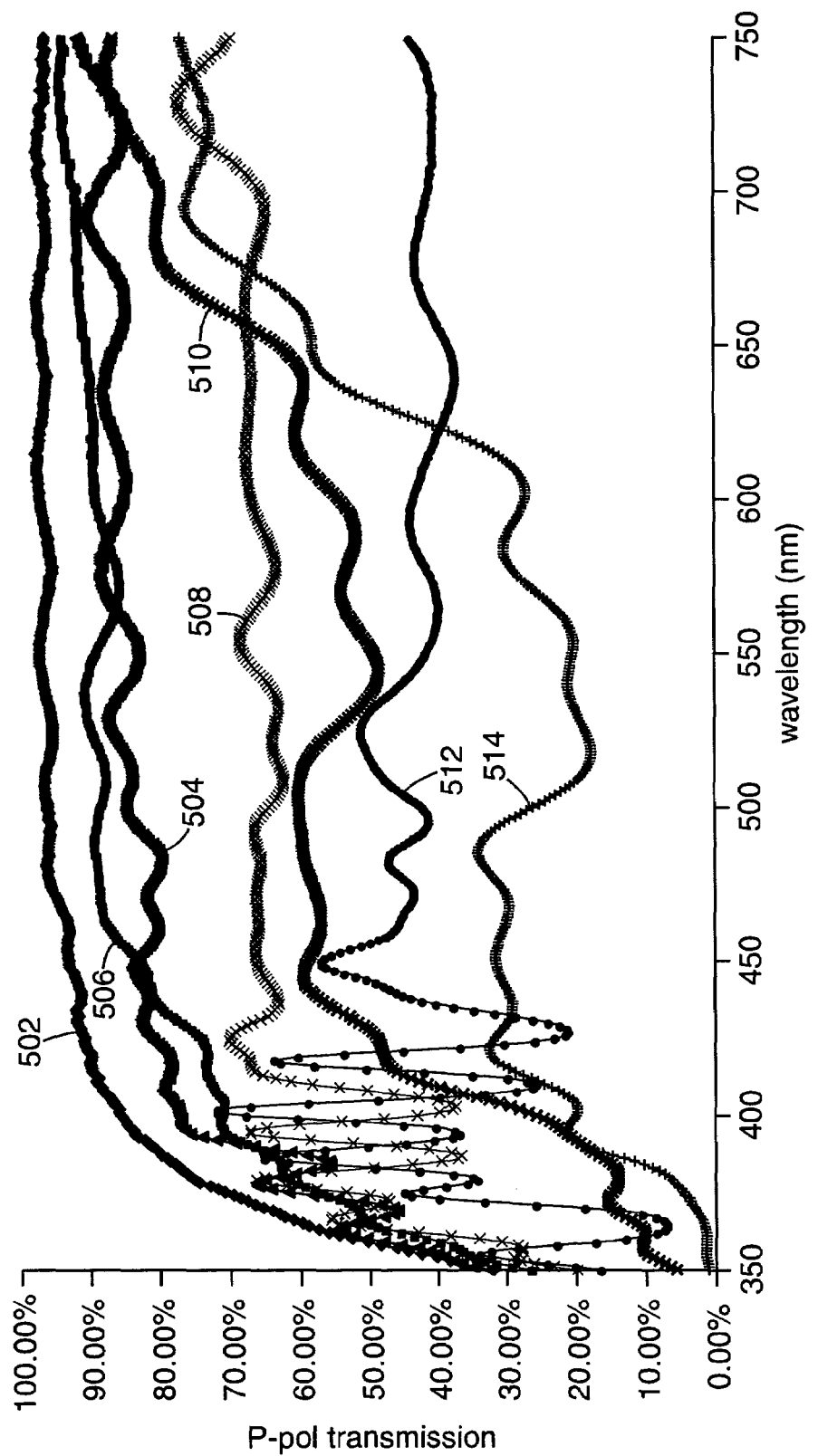
FIG. 5 presents a graph showing the transmission of light in the pass polarization state as a function of wavelength, for various angles of incidence on a MacNeille PBS.

For comparison, FIG. 5 shows the spectrum of p-polarized light transmitted through a MacNeille PBS. The MacNeille PBS is assumed to be provided with 45° glass prisms so that a 45° incident angle on the polarizer coating corresponds to Brewster's angle, i.e. maximum transmission for p-polarized light and maximum reflection for s-polarized light. When illuminated at 45°, curve 502, most of the p-polarized light is transmitted. However, even small deviations from 45° result in a reduction in the amount of light transmitted. Curves 504 and 506 respectively show the transmitted p-polarized light at 48° and 42° respectively. In each case, the transmission has fallen below 90% over most of the visible range (400 nm-700 nm). The MacNeille polarizer is assumed not to absorb visible light, so the reduction in the p-polarized transmission results in an increase in the p-polarized reflection. Further deviations result in even more p-polarized light being reflected. Curves 508 and 510 respectively correspond to incident angles of 51° and 39°, while curves 512 and 514 correspond to incident angles of 55° and 35°. As can be seen, the transmission at angles of 45°±10° is reduced below 50% over a significant portion of the visible spectrum.

Figure 6:
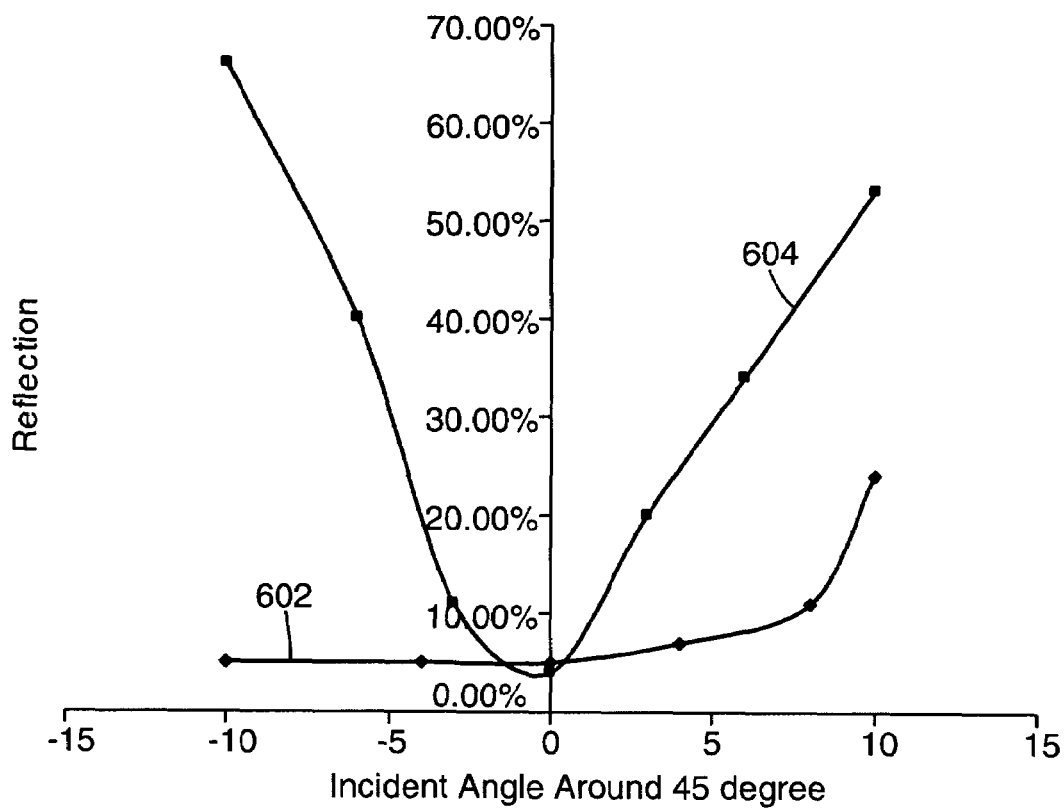
FIG. 6 presents a graph showing the reflection of light in the pass polarization state at one particular wavelength for an MOF PBS and for a MacNeille PBS, for various angles of incidence.

FIG. 6 shows a comparison of the reflection of the p-polarized light as a function of incident angle around 45°, for a wavelength of 488 nm, for the MOF PBS (curve 602) and the MacNeille PBS (curve 604). From FIGS. 4-6, it can be concluded that the performance of the MacNeille PBS is significantly different from the MOF PBS. When the MOF PBS is used, a reduction in transmission is only observed for incident angles greater than 45°. With the MacNeille PBS, on the other hand, the transmission is reduced for incident angles both larger and smaller than 45°. Also, for a given deviation from 45°, the amount of p-polarized light reflected is significantly greater with the MacNeille PBS than with the MOF PBS. This means that the p-polarized transmission is lower for the MacNeille PBS, especially when illuminated with light at low f-numbers. According to expressions (1) and (2) above, the performance of the projection engine shown in FIG. 1 is significantly improved by using one or more MOF-based PBSs, which have a higher value of Tp.

Referring once again to FIG. 4, consideration of the wavelength of the dip in p-polarized transmission as a function of incident angle shows that the blue p-polarized light reflected at a greater angle of incidence than the red p-polarized light. This leads to the conclusion that MOF PBS reflects p-polarized light with a rainbow type of effect, with different wavelengths being directed in different directions.

Figure 4:
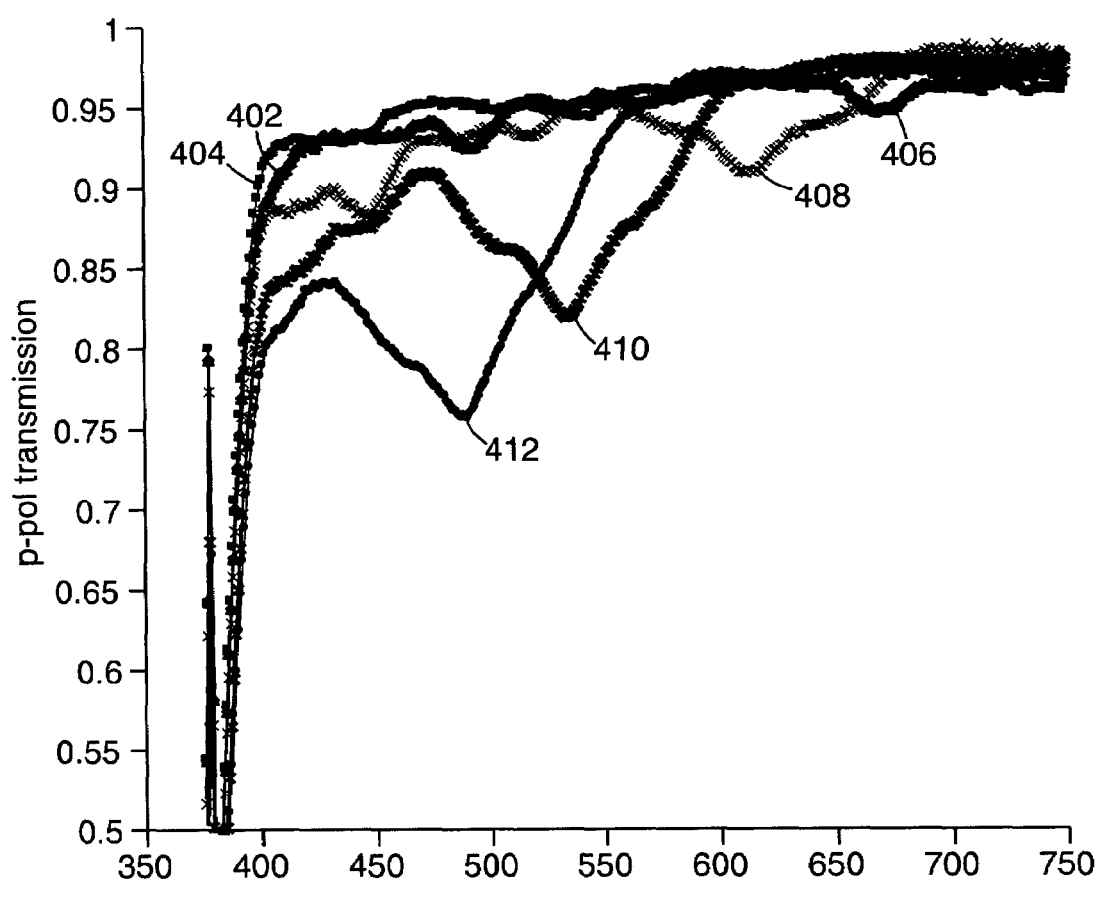
FIG. 4 presents a graph showing the transmission of light in the pass polarization state as a function of wavelength, for various angles of incidence on an MOF PBS.
Figure 7:
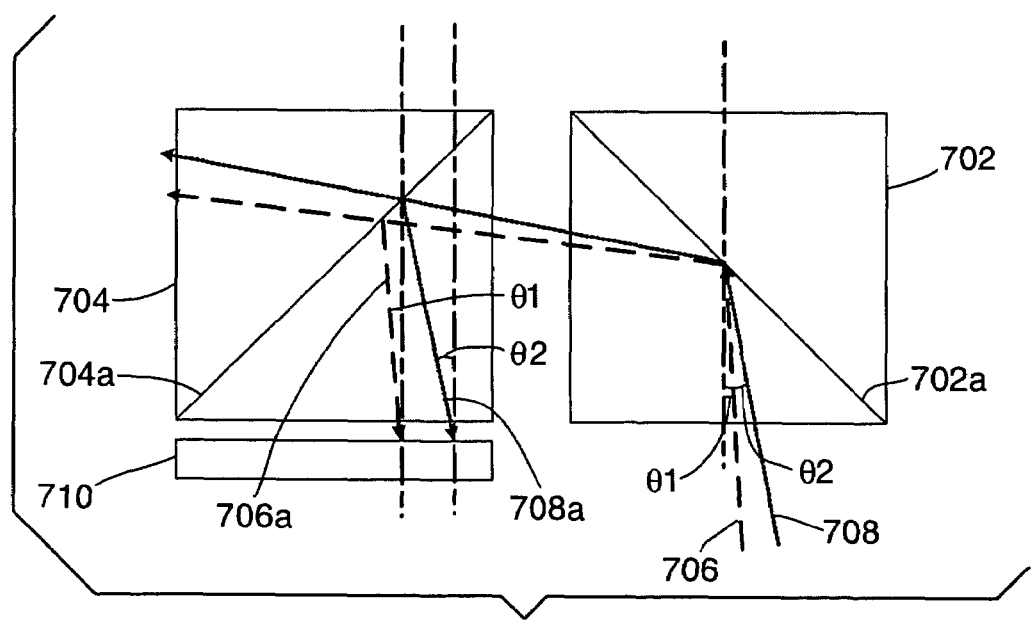
FIG. 7 schematically illustrates the "rainbow effect" for light in the pass polarization state reflected by an MOF PBS pair.

The asymmetry in the reflectivity of p-polarized light about the incident angle of 45°, as shown in FIG. 6, can be used to further reduce the amount of p-polarized red and blue light that enters the dark state of the green channel in the projection system 100. FIG. 7 shows an arrangement of two PBSs 702 and 704, each having a respective MOF PBS film 702a and 704a. Light beam 706 represents p-polarized red light incident on the MOF PBS film 702a at an angle of 45°+θ1, corresponding to the transmission dip shown in curve 408. Thus, the beam 706 is incident on the second MOF PBS film 704a at an angle of 45°−θ1. FIG. 4 shows that the p-polarized transmission remains high for light incident at an angle of less than 45° on the MOF PBS. Thus, the beam 706 is mostly transmitted by the second MOF PBS film 704a. The small fraction of p-polarized red light that is reflected by the second MOF PBS 704 is incident as beam 706a on the green light imager 710 at an angle of θ1. Likewise, beam 708, representing p-polarized blue light incident on the MOF PBS film 702a at an angle of 45°+θ2, corresponds to the transmission dip in curve 412. The beam 708 is incident on the second MOF PBS film 704a at an angle of 45°−θ2, and so only a small fraction is reflected as p-polarized light, beam 708a, towards the green imager 710.

Thus, since the second MOF PBS 704 reflects the p-polarized red and blue light only minimally, the light in the red and blue dark states is further reduced. This situation may be compared favorably to that where the second PBS is a MacNeille PBS. Since the angular dependence of reflection of p-polarized light is more symmetrical about the 45° incident condition for a MacNeille PBS, the second PBS directs more red and blue light to the green imager 710 and so the amount of light in the red and blue dark states is higher.

Some aspects of the MOF construction within the PBS assembly are more important than others for high p-polarized transmission. In particular, the multilayer construction manifests a high level of pass state index matching across the frequency or wavelength spectrum of interest to minimize the amount of p-polarized light lost by reflection through the multilayer. Generally, the amount of reflected p-polarized light is less than 3% of the incident light, and is preferably less than 1% for the given construction to deliver a p-polarized transmission through the film of 97% or more. Also, to increase throughput, the materials of the multilayer construction are non-absorbing or nearly non-absorbing over the spectrum of interest, e.g. the losses from absorption through the film are less than 3% and more preferably less than 1% for the given construction thickness to deliver a p-polarized transmission through the film of 97% or more. Also, the multilayer film exhibits a minimal amount of scattering of the transmitted light at the surfaces and through the volume of the MOF, in order to maintain good p-polarized transmission over the desired cone angle, e.g. to prevent redirection of the light to undesired angle outside the desired cone angle or to prevent the conversion of p-polarized light to the s-polarized state. Generally, the amount of light scattered outside of the desired cone angle is less than 3% and more preferably less than 1% for the given construction to deliver a p-polarized transmission through the film of 97% or more.

High reflectivity in MOF is achieved by large index of refraction differences for one of the in-plane refractive indices and large numbers of layer pairs tuned to the desired wavelength bands as described, e.g. in U.S. Pat. Nos. 5,808,794; 6,088,159; and 6,449,092, incorporated herein by reference. One advantage of a MOF PBS system that uses a MOF film between two 45° prisms is that the reflective power of the MOF is amplified relative to its normal reflection in air, due to the higher incident angle and high index of the prism glass, as is further described by U.S. Pat. No. 6,609,795, incorporated herein by reference. On the other hand, use of glass prisms with the MOF also results in an amplification of the reflective power of any small mismatches in refractive index between the various layers of the optical stack along the pass state, which results in a reduction of the p-polarized transmission. Thus, it is advantageous for the MOF PBS performance to achieve a high degree of refractive index matching for the in-plane refractive indices in the pass polarization state.

Because of the relatively high angle of incidence on the MOF, the light enters and travels through the film at a high angle, for example, with glass prisms having a refractive index of 1.85, the light passes through the MOF film at an angle of about 58° and with a cone angle of about 11°.

The effective refractive index for light in the transmitted p-polarization state is, therefore, a combination of the matched in-plane and thickness refractive indices. The effective refractive index, $n_{eff}$, may be calculated as taught, for example in "Introduction to Optical Electronics" by A. Yariv, Holt, Rinehart and Winston, New York, 1976, using the expression:

$$1/(n_{eff})^2 = (\cos^2 \theta)/(n_x^2) + (\sin^2 \theta)/(n_z^2)$$

where θ is the angle to the film normal and the matched in-plane refractive index is $n_x$. High p-polarized transmission requires that this effective index in the oriented high index layers is well matched to that of the low index layers. Preferably, this absolute difference is less than 0.01 across the spectrum, more preferably less than 0.004 and still more preferably less than 0.002, when the index difference between the matched and unmatched directions in the high index material is 0.13 or more, resulting in a contrast ratio of at least 300:1 for the given layer structure.

Because of the finite cone angle, it is preferred that the two components of the effective pass state index, i.e. $n_x$ and $n_z$ indices, are themselves well matched. In particular it is preferred that the indices be at least within 0.01, more preferably within 0.007, and still more preferably within 0.004.

Some films described below were drawn uniaxially according to the process as described in U.S. Pat. Nos. 6,609,795, and 6,449,093, incorporated herein by reference. The uniaxial draw in one direction causes a lengthening of the film in this direction and a nearly equal narrowing and thinning of the film in the non-drawn in-plane direction and thickness direction, respectively.

The stack of alternating low n and high n layers may be divided into multiple packets, separated by thicker layers of either material, or a third material, for example a processing aid during layer formation, so-called protective boundary layers (PBLs). Typically the physical exterior layers of the construction are PBLs or yet an additional skin layer(s). The skin layer may comprise similar materials to those used in the stack or still different materials. In particular, it may be useful to use a skin layer of a material that does not strongly bond to the inner MOF. Such a skin may be used as a protective layer during film drawing and post processing, and then be stripped off prior to final use. For example, olefinic skins, e.g. polypropylene or ethylene-propylene co-polymeric skins on polyester-based MOF, may be used.

When the outer PBLs are formed of one of the materials used in the optical stack, the indices of refraction of that material in the drawn optical stack may be estimated by measuring the indices of refraction of these drawn outer PBLs. One way of performing this measurement is to use a prism coupler technique, for example as is used in the Model 2010 Prism Coupler system manufactured by Metricon, Piscataway, N.J. In many cases, it has been found that the indices of the outer layers are a fair estimate of the orientation of the interior, optical layers. Thus when the PBLs comprise the high index material, the refractive indices of the drawn high index layers in the optical stack can be estimated by directly measuring the refractive indices of these outer PBLs. Likewise, when the outer layers comprise the low index material, measurements of the outer layer refractive indices provides a fair estimate of the orientation of the interior low index optical layers. Although conditions may arise which cause orientation of the low index material, usually the material remains essentially unoriented, and then the amorphous, isotropic index of that material is a good estimate of the refractive indices of the low index material optical layers. Thus, when the outer PBLs comprise the high index material and the drawing process leaves the low index material nearly un-oriented, then the overall matching between layers can be assessed.

The general precision obtained for refractive index measurements using the Model 2010 Prism Coupler system is at least ±0.001 (3 st. dev.) for a typical film. The accuracy is probably similar for the in-plane indices. The accuracy in the measurement in $n_z$ is not as high as that for the in-plane indices. In general, the measurement of $n_z$ tends to be a little low, perhaps by 0.001 or more. The value of $n_z$ may be measured in both in-plane physical alignments of the film with the device, i.e. when making measurements of $n_x$ and $n_y$. It has been found that, as the film becomes more anisotropic, the value of $n_z$ measured when the film is aligned to measure the draw direction index (the high index) is lower than the value of $n_z$ measured when the film is aligned to measure the in-plane direction index perpendicular to draw. In principle, these should be identical, thus yielding some bounds on accuracy. The discrepancy can be 0.006 or more. As the measurement is often of better quality in the pass direction, for example sharper modes and better fits, it is assumed that the value of $n_z$ obtained when measuring the value of n perpendicular to the draw is more accurate. Thus the reported value of $n_z$ may be at least 0.003 units higher, demonstrating an even better matching than the raw data.

One issue that arises in the manufacturing of the films is inter-diffusion, e.g. as described in U.S. Pat. No. 5,976,424. Diffusion of the high index material into the low index material can cause the index of the low index material to increase, assuming that the isotropic index of the high index material in its unoriented, isotropic state is higher than the index of the low index material in its unoriented, isotropic state, which is often the case. If sufficient interdiffusion occurs prior to stretching, at least portions of the low index layers may begin to orient. Typically, this can drop the index in the pass state below the initial pure index values. In general, a skin/PBL layer comprising the same material will be less prone to interdiffusion effects than a layer in the optical stack, because it is much thicker. Thus, high index optical layer behavior is typically no more oriented than a skin/PBL comprising the high index material, and the low index optical layer behavior is no less oriented than a skin/PBL comprising low index material.

The example constructions comprise an optical stack with an increasing layer gradient, for example from blue to red in reflectance at the chosen PBS conditions, proceeding from the so-called "top" to "bottom." The "top" blue side also corresponds to the wheel side in the film casting process while the "bottom" is the air side. The film is electrostatically pinned during casting. The "top" side exhibits very slightly lower orientation (e.g. lower block and higher pass state indices) due to slight variation in heat transfer, etc., during film stretching. Best estimates for indices in the MOF stack, discounting interdiffusion, may be calculated by interpolating between the top and bottom indices by the position of the layer(s) of interest within the construction.

Figure 8:
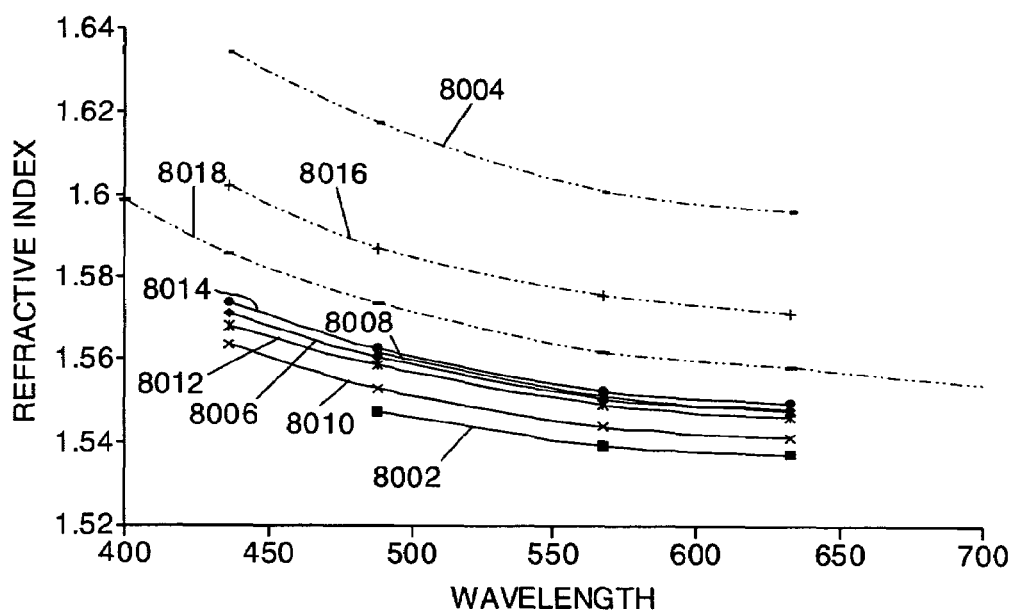
FIG. 8 presents a graph showing refractive index as a function of wavelength for various polymeric materials.

FIG. 8 provides the refractive index of several different types of materials that may be used in a MOF film stack. The refractive indices are for cast materials, and represent the isotropic index of the materials, before stretching and orientation. The reported values are the averages of the various directions which differed only slightly, e.g. within experimental error. The different materials are listed according to Table I.

TABLE I

Materials Shown in FIG. 8

| Curve No. | Material |
|---|---|
| 8002 | CoPET A |
| 8004 | PCTG |
| 8006 | 50% CoPET A/50% PCTG |
| 8008 | 50% CoPET A/50% PCTG |
| 8010 | CoPET F |
| 8012 | 70% CoPET F/30% PCTG |
| 8014 | 70% CoPET F/30% PCTG |
| 8016 | Eastman PET |
| 8018 | 30/70 CoPEN |

The materials listed in Table I are now described. CoPET A, curve 8002, is a PET co-polymer made in accordance with the description of aforementioned U.S. Pat. No. 6,609,795, and was made as follows. 69.1 kg of 1,4-dimethylterephthalate, 75.5 kg of 1,4 dimethylcyclohexanedicarboxylate, 8.2 kg of 1,4-cyclohexanedimethanol, 98.2 kg of 1,2-ethane diol, 0.73 kg of trimethylol propane, 35 g of zinc acetate, 20 g of cobalt acetate, and 50 g of antimony acetate were charged into a batch reactor and the mixture was heated to 254° C., under pressure of 0.20 MPa, while removing methanol. After 45.5 kg of methanol was removed, 52 g of triethyl phosphonoacetate was charged to the reactor and then the pressure was gradually reduced to 133 Pa while heating to 285°. The condensation reaction by-product, ethylene glycol, was continuously removed until a polymer with an intrinsic viscosity of 0.84 dL/g, as measured in 60/40 wt. % phenol/o-dichlorobenzene, was produced.

PCTG, curve 8004, is a commercial grade co-polymer of PET, available from Eastman Chemical Co., Kingsport Tenn. Curves 8006 and 8008 each represent 50% coPET A/50% PCTG in a transesterified blend resulting from the feeding of equal weights of coPET A and PCTG into the extruder.

CoPET F, curve 8010, is also a PET co-polymer, and is formed as follows. 53.9 kg of 1,4-cyclohexanedimethanol, 31.4 kg of 1,4 dimethylcyclohexanedicarboxylate, 79.0 kg of 1,4-dimethylterephthalate, 59.0 kg of 1,2-ethane diol, 16.5 kg of neopentyl glycol, 1.20 kg of trimethylol propane, between 40 and 60 grams of zinc acetate and between 18 and 25 grams of cobalt acetate were charged into a batch reactor. Under pressure of 0.27 MPa, this mixture was heated to 250° C. while removing methanol. After 34.7 kg of methanol was removed, 69 g of triethyl phosphonoacetate was charged to the reactor, and another 15 to 20 minutes later, between 70 and 90 grams of antimony acetate was added. The pressure was gradually reduced to about 250 Pa while heating to 290° C. The condensation reaction by-product, ethylene glycol, was continuously removed until a polymer with an intrinsic viscosity of 0.69 dL/g, as measured in 60/40 wt. % phenol/o-dichlorobenzene, was produced. The final polymer composition had a mass of 146.51 kg and contained between about 0.0171 wt. % and 0.0123 wt. % cobalt acetate, between about 0.0273 wt. % and 0.041 wt. % zinc acetate and between about 0.0478 wt. % and 0.0615 wt. % antimony acetate. In some embodiments, the catalyst charge was about 0.0141 wt. % cobalt acetate, 0.0338 wt. % zinc acetate and 0.0546 wt. % antimony acetate. Curves 8012 and 8014 each represent 70% coPET F/30% PCTG in a transesterified blend resulting from the feeding of coPET F and PCTG into the extruder.

Eastman PET, curve 8016, is PET 7352, available from Eastman Chemical Co., Kingsport Tenn.

The 30/70 coPEN, curve 8018, is useful as a high index material, and is essentially a copolymer of 30% polyethylene naphthalate (PEN) and 70% polyethylene terephthalate (PET), as described in U.S. Pat. No. 6,574,045. In accord with this description, 30/70 is a coPEN comprising carboxylate subunits with 30 mol % naphthalate subunits and 70 mol % terephthalate.

EXAMPLES

Manufacturing Method

Various PBSs are discussed in the following examples. In these examples, the MOF polarizing films were similar in construction and processing, essentially varying in their material composition and final thickness and through secondary variations resulting from the use of different casting speeds needed to achieve these varying thicknesses at constant melt pumping rates. The films were coextruded and drawn in accordance with the general methods described in U.S. Pat. No. 6,609,795. The material stream then passed though an asymmetric two times multiplier, for example in a manner as described in U.S. Pat. Nos. 5,094,788 and 5,094,793. The multiplier thickness ratio was about 1.25:1. Following the multiplier, the film had about 446 layers, made of two sets of 223 layers. Each set of 223 layers had the approximate layer thickness profile created by the feedblock, with overall thickness scale factors determined by the multiplier and film extrusion rates.

The material stream was then passed though a second asymmetric two times multiplier with a multiplier ratio of about 1.55:1. The final layer distribution was thus a composite of four packets, each with about 223 layers, totaling about 892 layers. The average spectral separation of each packet affected the spectrum of light that leaked through the resulting PBS in the block polarization state. The casting wheel speed was adjusted for precise control of final film thickness.

The cast precursor web was cut into 18 cm by 25 cm sheets (MD×TD in which MD is the original direction of film casting (machine direction) and TD is the transverse direction), and these sheets were equilibrated at 50% R.H. and room temperature before stretching. After equilibration, the samples were fed into a standard film tenter for uniaxial stretching. The cast web piece was gripped by the tenter clips on the edges as for continuously oriented films. The film near the clips, when tentered, does not contract in the MD because the spacings between the tenter clips are fixed. The web was not constrained on the leading and trailing edges, however, and so it contracted in the MD, the contraction being larger the greater the distance from the clips. With large enough aspect ratios, the center of the sample is able to fully contract for a true uniaxial orientation, i.e. where the contraction was equal to the square root of the TD stretch ratio.

The films were fed with their long (25 cm) direction in TD into the tenter set at a temperature of 98° C. The films were drawn to a final nominal draw ratio 6.5 after a brief overshoot to a nominal draw ratio of 7. The final draw ratio was slightly higher in the central portion of the sheet due to slightly less drawing near the clips, actively cooled to 52° C. The films were generally drawn so that the refractive index of the birefringent layer in the MD closely matched the refractive index of the isotropic layer. The z direction index of the birefringent layer was likewise closely matched to that of the isotropic layer. The inlet feed speed, providing initial strain rates in the range of 0.05 to 1 $sec^{-1}$, was used to control the final refractive index and ensure index matching.

Example 1

Single Stack MOF PBS

A multilayer construction was fabricated with alternating layers of a 30/70 naphthalene dicarboxilic acid/dimethyl terephthalate-based coPEN as the high index layers with a 50/50 blend of a coPET and PCTG (curve 8006) as the low index layer. The external layers of the MOF construction were thick layers of the high index material used to protect the MOF stack during the flow process, e.g. protective boundary layers (PBLs). Finally, a protective, strippable skin layer of an ethylene-propylene copolymer, #8650 available from FINA, was added in the final portion of the co-extrusion prior to the die flow, exit and casting.

The refractive indices of the outer (PBL) layers were measured using the Metricon Prism coupler system under illumination with light at four different vacuum wavelengths, 435.8 nm, 488 nm, 568 nm and 632.8 nm. Table II provides a summary of the measured values of refractive index for the top of the film and Table III provides a summary of the measured values of refractive index for the bottom of the film. In these tables, the refractive index for the stretch direction is given as $n_y$, and $n_x$ for the non-stretch direction.

TABLE II

Refractive index measurements for top of MOF Stack

| wavelength | $n_y$ | $n_x$ | $n_z$/MD | ave. $n_z$ | ave. ($n_x - n_z$) |
|---|---|---|---|---|---|
| 435.8 nm | 1.8151 | 1.5756 | | | |
| 488 nm | 1.7833 | 1.5634 | 1.556 | 1.556 | 0.0074 |
| 568 nm | 1.7576 | 1.553 | 1.5434 | 1.5434 | 0.0096 |
| 632.8 nm | 1.7448 | 1.5496 | 1.5434 | 1.5434 | 0.0062 |

TABLE III

Refractive index measurements for bottom of MOF Stack

| wavelength | $n_y$ | $n_x$ | $n_z$/TD | $n_z$/MD | ave. $n_z$ | ave. ($n_x - n_z$) |
|---|---|---|---|---|---|---|
| 435.8 nm | 1.8108 | 1.5772 | | 1.572 | 1.572 | 0.0069 |
| 488 nm | 1.7877 | 1.5632 | | 1.5567 | 1.5567 | 0.0065 |
| 568 nm | 1.7621 | 1.552 | | 1.5463 | 1.5463 | 0.0057 |
| 632.8 nm | 1.751 | 1.5488 | 1.5434 | | 1.5434 | 0.0054 |

Here the $n_y$ index is the draw direction of maximum reflectivity, and is parallel to the block axis. The $n_x$ direction is the machine direction (MD) and is the non-drawn in-plane direction. The film orientation for the measurement of $n_z$ is provided as TD or MD. A simple average of $n_z$/TD and $n_z$/MD is taken where available. The ave. ($n_x - n_z$) column provides a conservative estimate of the refractive index difference between the $n_x$ and $n_z$ refractive indices. The index differences are, most likely, smaller than those given.

Figure 9:
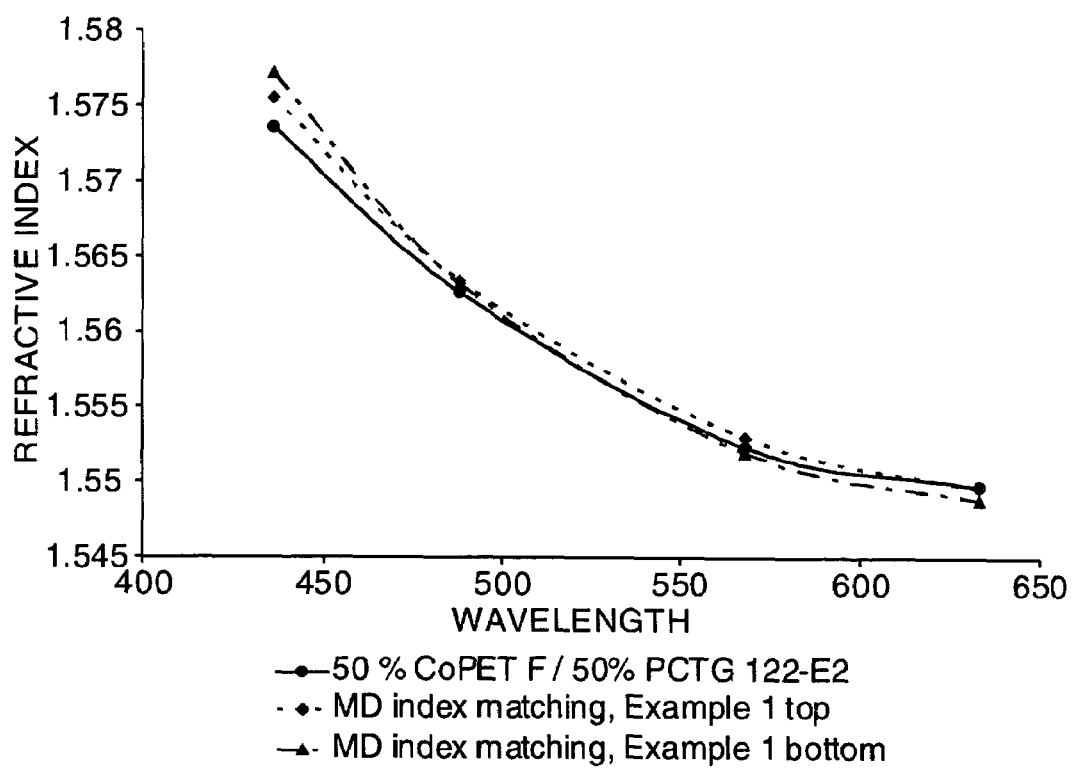
FIG. 9 presents a graph showing refractive index as a function of wavelength for the matched, in-plane refractive indices in the MOF PBS of Example 1.

A comparison of the in-plane, pass-state refractive index of the high refractive index PBL, after stretching, to the un-oriented cast web of the low refractive index material, is presented in FIG. 9 for four vacuum wavelengths in the visible portion of the spectrum, 435.8 nm, 488 nm, 568 m and 632.8 nm. The measurements were made for both the top and bottom layers of the MOF stack using the Metricon Prism Coupling device. Assuming negligible inter-diffusion, the results indicate excellent index matching between $n_x$ of the low n, 50% CoPET/50% PCTG blend and the values of $n_x$ obtained for the top and bottom layers of the stack. The values of $n_x$ are within 0.003 index units across the spectrum. Furthermore, this graph shows that the value of $n_x$ for the oriented material (top and bottom layers) is equal to or less than $n_x$ of the low n layer at about 630 nm, and is greater than $n_x$ of the low n layer at about 430 nm. Thus, the sign of the difference between $n_x$ of the high and low n layers at a wavelength above about 600 nm is different from the sign of the difference between $n_x$ for the high and low n layers at a wavelength below about 450 nm.

Figure 10:
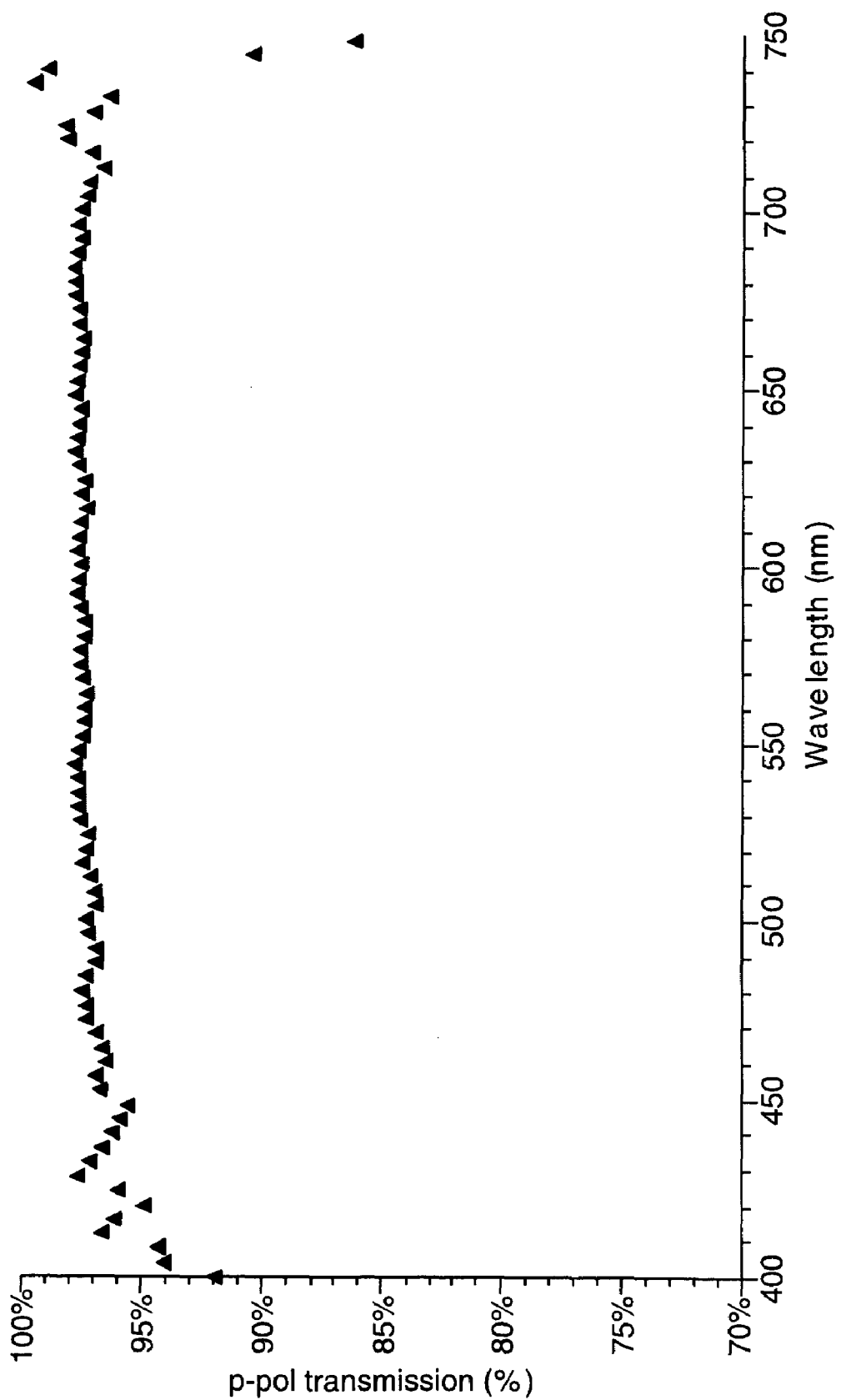
FIG. 10 presents a graph showing the transmission of light in the pass polarization state as a function of wavelength for the MOF PBS of Example 1.

The MOF stack, whose properties are listed in Tables II and III and are shown in FIG. 9, was incorporated in a PBS by sandwiching the MOF between two NSK5 glass prisms. The transmission of p-polarized light was measured as a function of wavelength: the results are presented in FIG. 10. The transmission of p-polarized light is >95% for all wavelengths in the range of about 430 nm-about 700 nm. The photopically weighted p-polarized transmission is in excess of 97% over the range of about 430 nm-about 700 nm.

Figure 11:
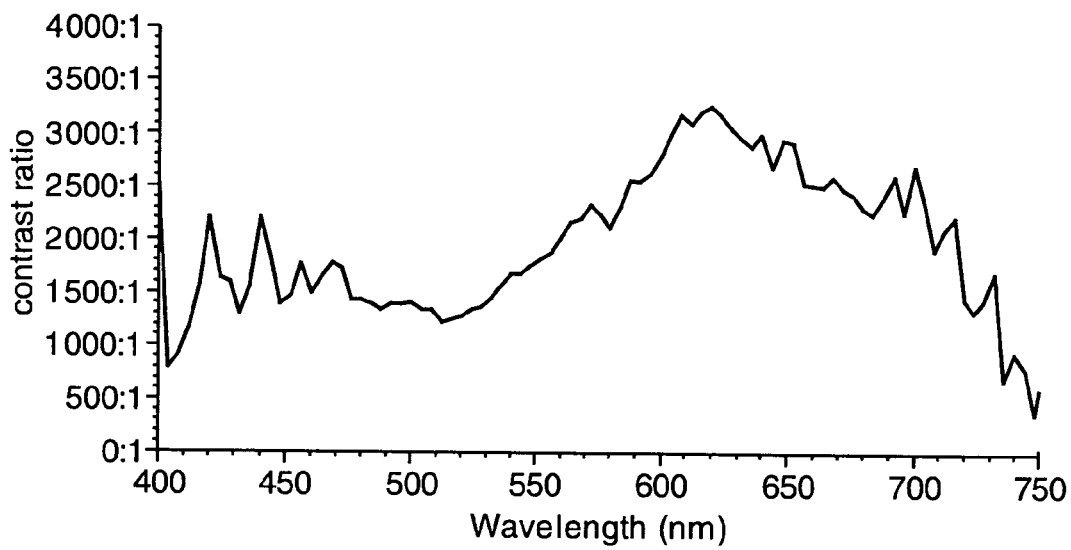
FIG. 11 presents a graph showing the contrast as a function of wavelength for the MOF PBS of Example 1.

The contrast ratio, defined above, was also measured: the results are presented in FIG. 11. Over the wavelength range of about 430 nm-about 700 nm, the contrast is in excess of 1300:1 and the photopically weighted contrast is in excess of 2000:1.

Figure 12:
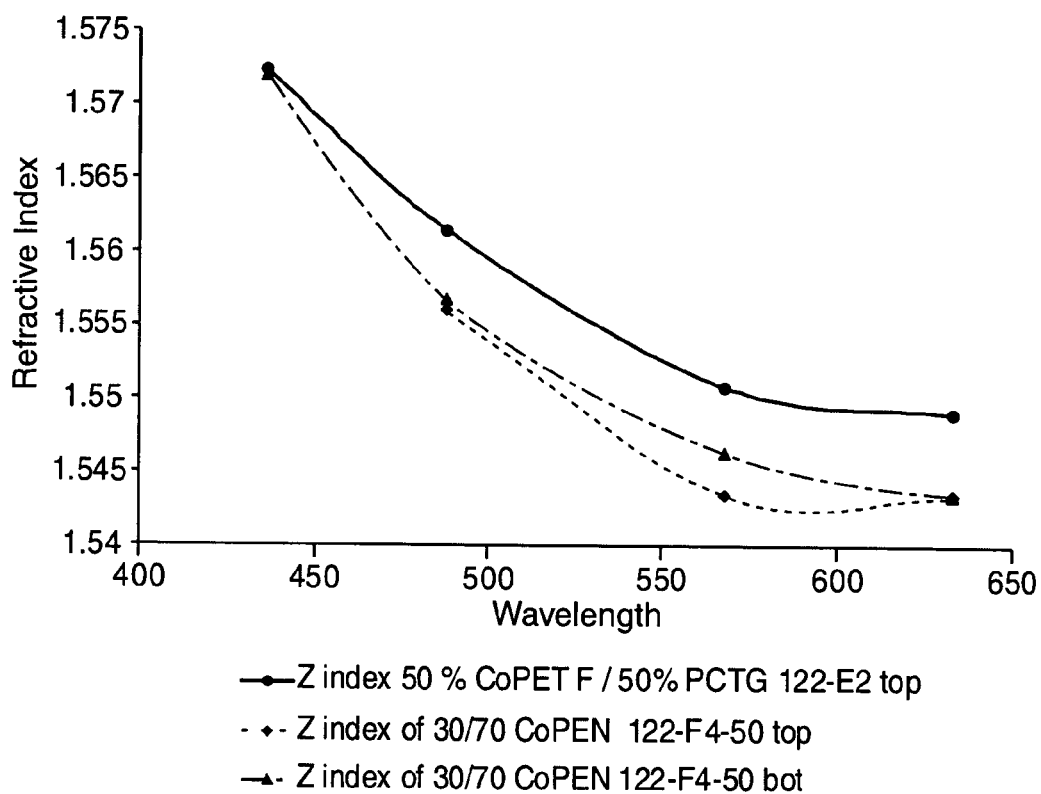
FIG. 12 presents a graph showing refractive index as a function of wavelength for the z-refractive indices (thickness refractive indices) for the MOF PBS of Example 1.

The results of the measurements of $n_z$ are shown in FIG. 12. The values of $n_z$ apparently match less well between the low and high n layers than for the in-plane refractive index, and the total mismatch is about −0.005. An effective average of $n_z$ and $n_x$ for the pass state, therefore, lies between the values of +0.003 for the $n_x$ mismatch and −0.005 for the $n_z$ mismatch, and is around −0.002. A good measure of the difference between the matched in-plane refractive index and the z-index may arise due to the limitations of the measurements itself as described previously.

In some instances, polarizing beamsplitters that use MOF films may demonstrate haze. Haze may reduce the contrast of a projection system and may also cause a dark state non-uniformity because the PBS is neither at the object nor the pupil location. One potential cause of haze may be discrete, colored points of light observed upon illumination of the MRP film. These points of light appear to be localized leaks of x-polarized light (light polarized in the x-direction), which can be substantially the same as s-polarized light. Such leaks may be caused by disruptions in the layer structure of the MOF film caused by particulates, localized voids or delamination in the film layers, crystallites, flow instabilities during co-extrusion, or other defects in the film. Since the haze is polarized in the polarization direction that the PBS predominantly reflects, the haze may be eliminated with a clean-up post-polarizer oriented to pass the desired pass state light (p-polarized). A perfect clean-up post-polarizer (CUPP), in principle, does not degrade the projected image. However, in practice, the use of a CUPP may cause a 10% to 15% loss of brightness in the projected image. A CUPP also adds to the cost and complexity of the projection system. Haze often accompanies a reduction in the p-polarized transmission from >95%.

The film described above with regard to this example showed little haze. The % haze as measured on a Haze Guard Plus Instrument, available from BYK Gardner USA, Columbia Md., was 1.22% with the red/air side facing the detector and 0.71% with the blue/wheel side facing the detector.

Example 2

MOF PBS with Lower Index Matching

A multilayer construction was made using alternating layers of a 0.74 inherent viscosity (I.V.) PET available from Eastman Chemical, TN, as the high index layers and a 50/50 blend of a coPET A and PCTG (curve 8006) as the low index layer. The external layers of the MOF construction are thick layers of the high index material used to protect the MOF stack during the flow process, e.g. protective boundary layers (PBLs). Finally, a protective, strippable skin layer of an ethylene-propylene copolymer, #8650 available from FINA, is added in the final portion of the co-extrusion prior to the die flow, exit and casting. The final thickness of the drawn film was similar to example 1.

After removing the strippable skin, the haze of this film was found to be low. The % haze as measured on a Haze Guard Plus Instrument, available from BYK Gardner USA, Columbia Md., was 1.02% with the red/air side facing the detector and only 0.80% with the blue/wheel side facing the detector. Thus the measured haze was very similar to the film of Example 1.

The measured values for the high index values at the top of the film, Table IV, and the bottom of the film, Table V, are provided below.

TABLE IV

Refractive index measurements for top of MOF Stack

| wavelength | $n_y$ | $n_x$ | $n_z$/TD | $n_z$/MD | ave. $n_z$ | ave. $(n_x - n_z)$ |
|---|---|---|---|---|---|---|
| 488 nm | 1.7161 | 1.5546 | 1.5445 | 1.5494 | 1.547 | 0.0076 |
| 568 nm | 1.6959 | | | 1.5403 | 1.5403 | |
| 632.8 nm | 1.6867 | 1.5449 | 1.5371 | 1.5376 | 1.5374 | 0.0075 |

TABLE V

Refractive index measurements for bottom of MOF Stack

| wavelength | $n_y$ | $n_x$ | $n_z$/TD | $n_z$/MD | ave. $n_z$ | ave. $(n_x - n_z)$ |
|---|---|---|---|---|---|---|
| 488 nm | 1.7211 | 1.5531 | | 1.5469 | 1.5469 | 0.0062 |
| 568 nm | 1.7011 | 1.5419 | | 1.5403 | 1.5403 | 0.0016 |
| 632.8 nm | 1.6925 | 1.5407 | 1.5378 | 1.5367 | 1.5373 | 0.0034 |

Figure 13:
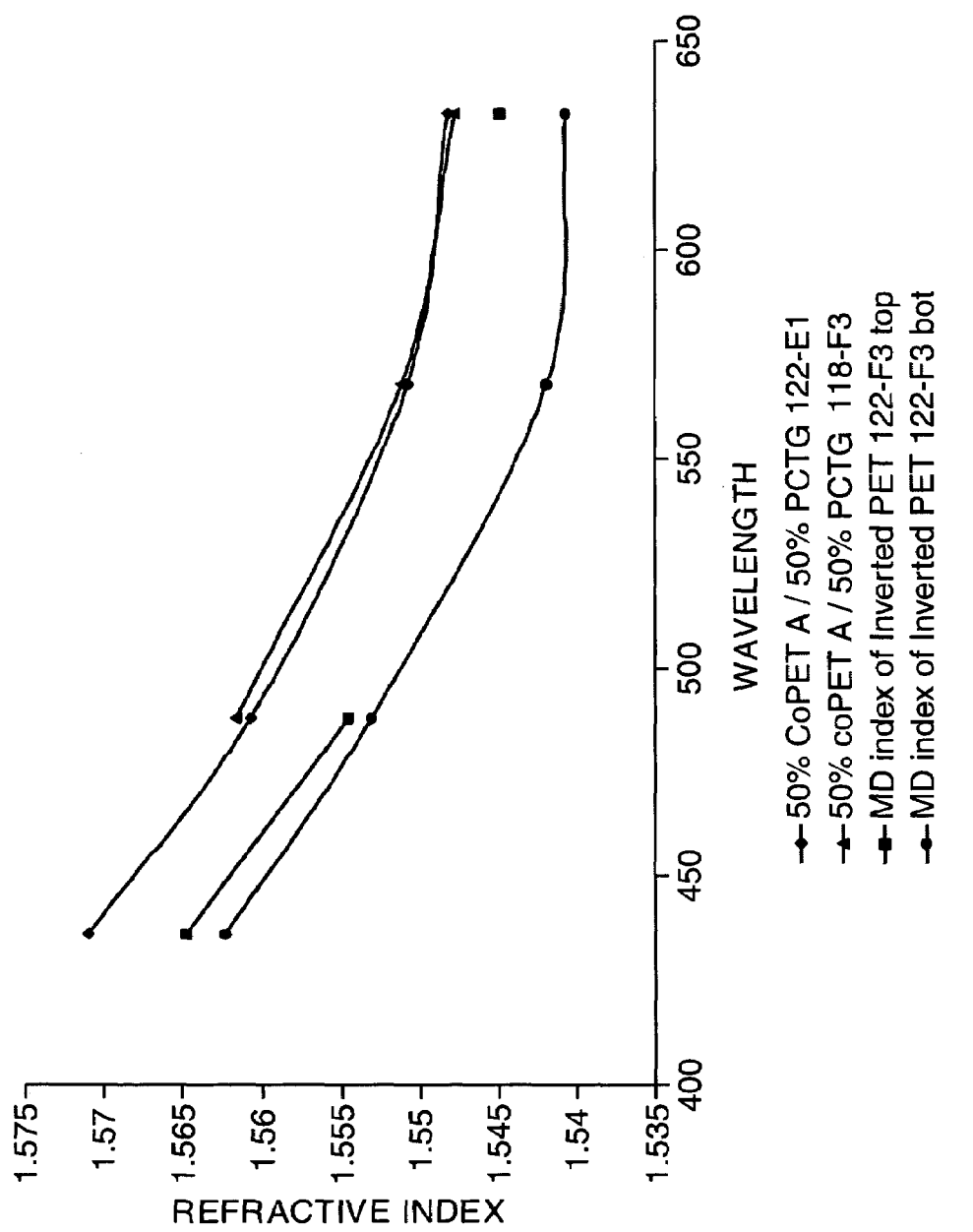
FIG. 13 presents a graph showing the in-plane refractive indices for the MOF PBS of Example 2.
Figure 14:
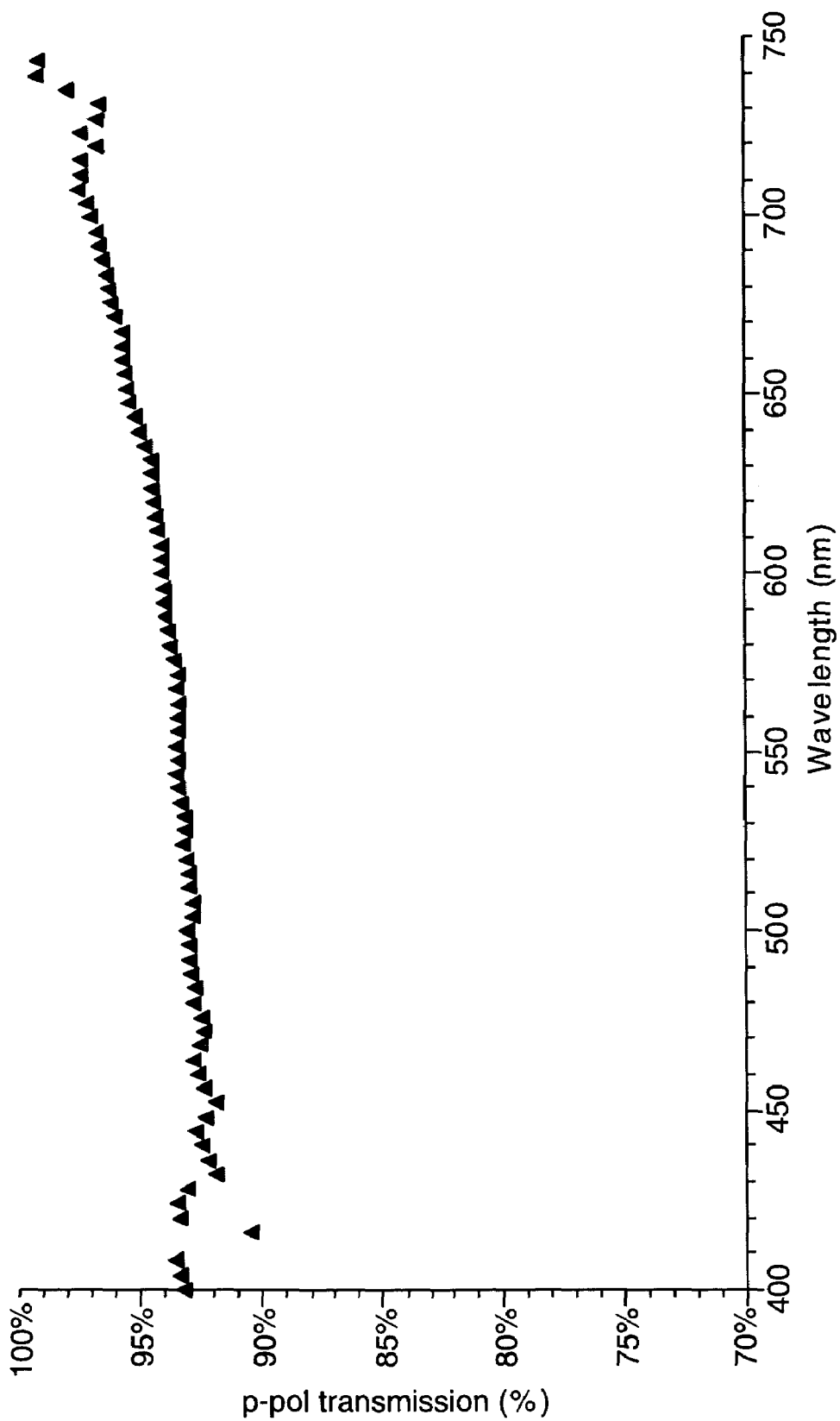
FIG. 14 presents a graph showing the transmission ratio of light in the pass polarization direction as a function of wavelength for the MOF PBS of Example 2.

FIG. 13 shows the comparison of the in-plane, pass state index of the high index PBL to the un-oriented cast web of the low index material, for the four wavelengths in the visible portion of the spectrum, 435.8 nm, 488 nm, 568 nm and 632.8 nm, as measured by a Metricon prism coupling device. Assuming negligible interdiffusion, the results show relatively good matching between the high and low index material layers, although the index matching might be improved upon. Because the high index material, PET, is oriented only along the block/reflective state, the higher index PET is only necessarily higher than the low index material in that block direction. In this example, the high index material's pass state refractive index is actually lower than the essentially isotropic index of the low index material. The index difference is nearly −0.01 (ref. index of high index material minus ref. index of low index material). The resulting p-polarized transmission, shown in FIG. 14, is about 92% or more for wavelengths across the visible spectrum (430 nm-700 nm). This demonstrates the need for the better than 0.01 index matching (absolute value of difference) for in-plane refractive indices to achieve high p-polarized transmissions, e.g. 97% or higher. The photopically weighted contrast (about 658:1 for the PBS) is lower in this example than that of Example 1 because the index difference in the block state between high and low refractive index material is significantly less in this case (e.g. only about 0.14 at 632.8 nm vs. about 0.20 in example 1) for the same basic layer thickness distribution.

This film does not perform as well as the film discussed in Example 1 when used in a PBS configuration.

Example 3

Dual Stack MOF PBS

Another approach to obtaining uniform MOF PBS performance over a broad spectral range is to use an arrangement with two MOFs placed together in the PBS. Such an approach is discussed in greater detail in U.S. patent application Ser. No. 10/439,444, incorporated herein by reference.

A copolyester, conveniently labeled as coPET, for use as the low index layer in the multilayer film, was synthesized as follows. The following components were charged into a 100 gallon batch reactor: 174.9 lbs 1,4-dimethyl terephthalate, 69.4 lbs 1,4 dimethyl cyclohexanedicarboxylate, 119.2 lbs 1,4-cyclohexane dimethanol, 36.5 lbs neopentyl glycol, 130 lbs ethylene glycol, 1200 g trimethylol propane, 23 g cobalt acetate, 45 g zinc acetate, and 90 g antimony acetate. Under pressure of 0.20 MPa, this mixture was heated to 254° C. while removing methanol. After 80 lbs of methanol was removed, 64 g of triethyl phosphonoacetate was charged to the reactor and then the pressure was gradually reduced to 2 mm Hg while heating to 285° C. The condensation reaction by-product, ethylene glycol, was continuously removed until a polymer with an intrinsic viscosity of 0.74 dL/g, as measured in 60/40 wt. % phenol/o-dichlorobenzene, was produced. The glass transition temperature, $T_g$, of the coPET was measured to be 64° C. by Differential Scanning Colorimetry (DSC). The refractive index of the material at 632.8 nm was measured as 1.541 using the Metricon Prism Coupler.

PET with an initial intrinsic viscosity (IV), e.g., of 0.74 dl/g PET 7352, as available from Eastman Chemical Company TN, was fed into an extruder and delivered to the feedblock at a rate of 50 kg/hr. The coPET material was delivered by another extruder at 43 kg/hr. The meltstreams for the two materials were directed to the feedblock to create 223 alternating layers of PET and coPET, having a layer thickness range sufficient to produce an optical reflection band with a fractional bandwidth of 30%. An approximate linear gradient in layer thickness was produced by the feedblock for each material with the ratio of thickest to thinnest layers being 1.30. The two outside layers of PET served as protective boundary layers (PBL) through the feedblock. The PBLs were much thicker than the optical layers, the former containing about 20% of the total meltflow of the PET (10% for each side).

After being co-extruded and passing through the multpliers, the outside skin layers of polypropylene (PP) (Polypropylene Type 8650, available from Atofina Petrochemicals, Inc., Houston, Tex.) were added to the meltstream. The PP was fed to a third extruder at a rate of 24 kg/hour. Then the material stream passed through a film die and onto a water-cooled casting wheel. The inlet water temperature on the casting wheel was 8° C. A high voltage pinning system was used to pin the extrudate to the casting wheel.

The casting wheel speed was adjusted for precise control of final film thickness. In this manner, the various pre-cursor un-oriented cast webs were made for Films 1-4. For example, using the casting wheel speed of Film 1 as a reference, the ratio of speeds used to form Films 2-4 were 0.77, 1.21, and 1.06 respectively, thereby approximately changing the thicknesses of these films relative to Film 1 by the reciprocals of these ratios. Thus, the film thicknesses, relative to Film 1, were: 1, 1.3, 0.83 and 0.94.

The films were generally drawn so that the MD index (e.g. y direction index) of refraction of the PET PBL, as measured on the final stretched part using the Metricon Prism Coupler, closely matched the amorphous index of the coPET, e.g., 1.541+/−0.002 at 632.8 nm. The z direction index of the PET PBL was likewise closely matched, about 1.540 at 632.8 nm. Finally, the dispersion curves of the PET y, z and coPET isotropic indices were reasonably similar over the visible spectrum to nearly maintain this level of index matching through the blue portion of the spectrum (e.g. 430 nm). The inlet feed speed, providing initial strain rates in the range of 0.05 to 1 $\sec^{-1}$, was used to control the final refractive index and ensure the index matching. The resulting Films 1-4 had nearly identical refractive indices in their PET PBLs after drawing, each measuring 1.70 to within an error of 0.01 for 632.8 nm light polarized along TD). The example Films 1-4 varied by their final thickness, with PP skins peeled off, with measured values of 120, 160, 96, and 114 micrometers respectively.

Figure 15:
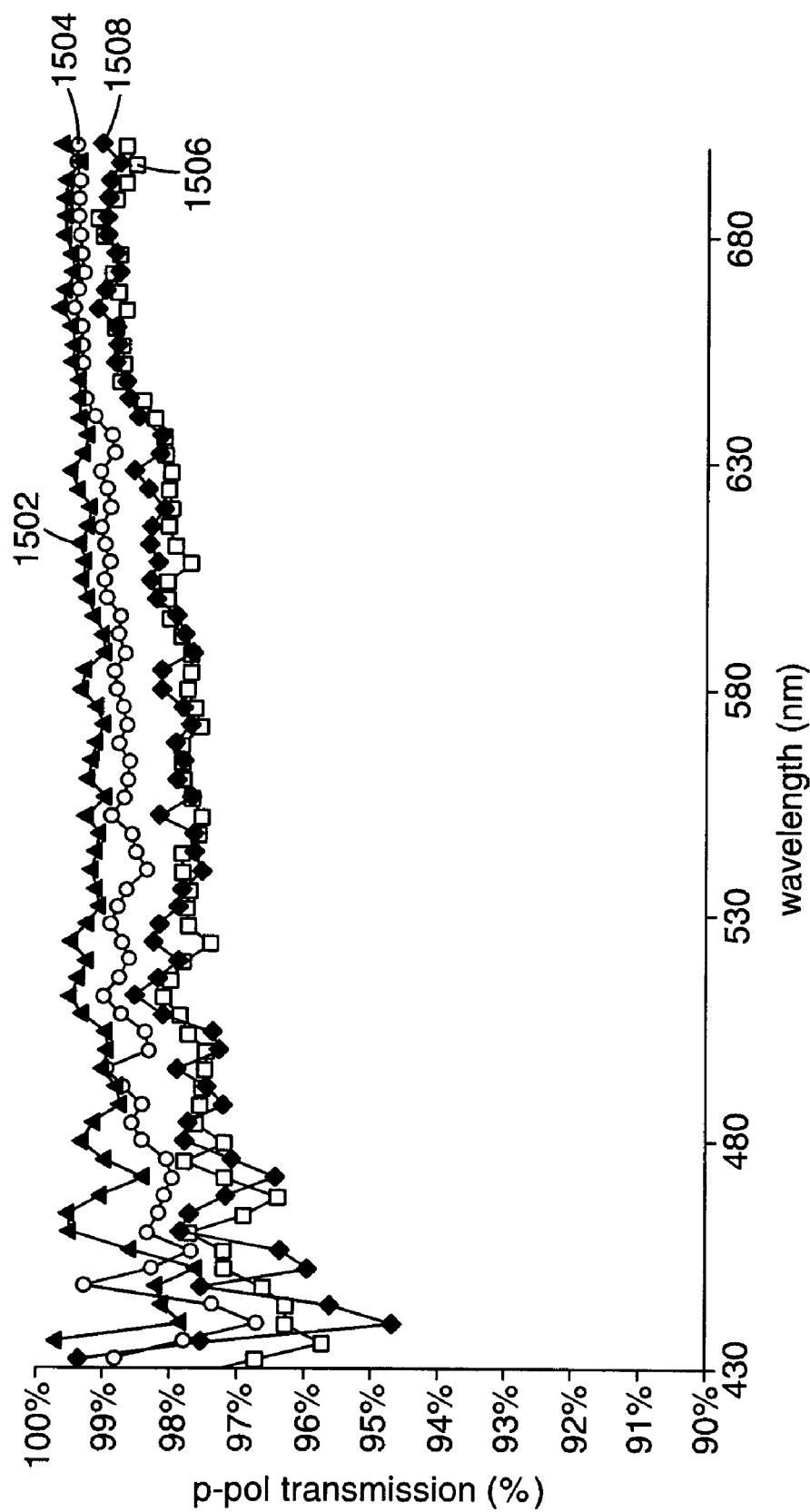
FIG. 15 presents a graph showing the transmission of light in the pass polarization state as a function of wavelength for exemplary MOF samples of Example 3.

The p-polarized transmission spectrum for the four films 1-4 are shown respectively as curves 1502, 1504, 1506 and 1508 in FIG. 15. the four films show consistently high transmission across the visible spectrum, with a small fall-off in the blue.

A PBS was prepared using a double laminate comprising Films 1 and 2, with index matching fluid between the films, and the film laminate positioned between two prisms. The index matching fluid was LASER LIQUID from Cargille (Cedar Grove, N.J., USA) with an index of n=1.5700, while the glass prisms used were SK5 glass Schott Corporation (Meinz, Germany) having an index of refraction about 1.59. The PBS was tested in an f/2 beam of light using a High Pressure Hg lamp, tunnel integrator, and appropriate lenses and color filters to focus the light onto a test mirror as described, e.g., in U.S. Pat. No. 6,486,997 B1.

Figure 16:
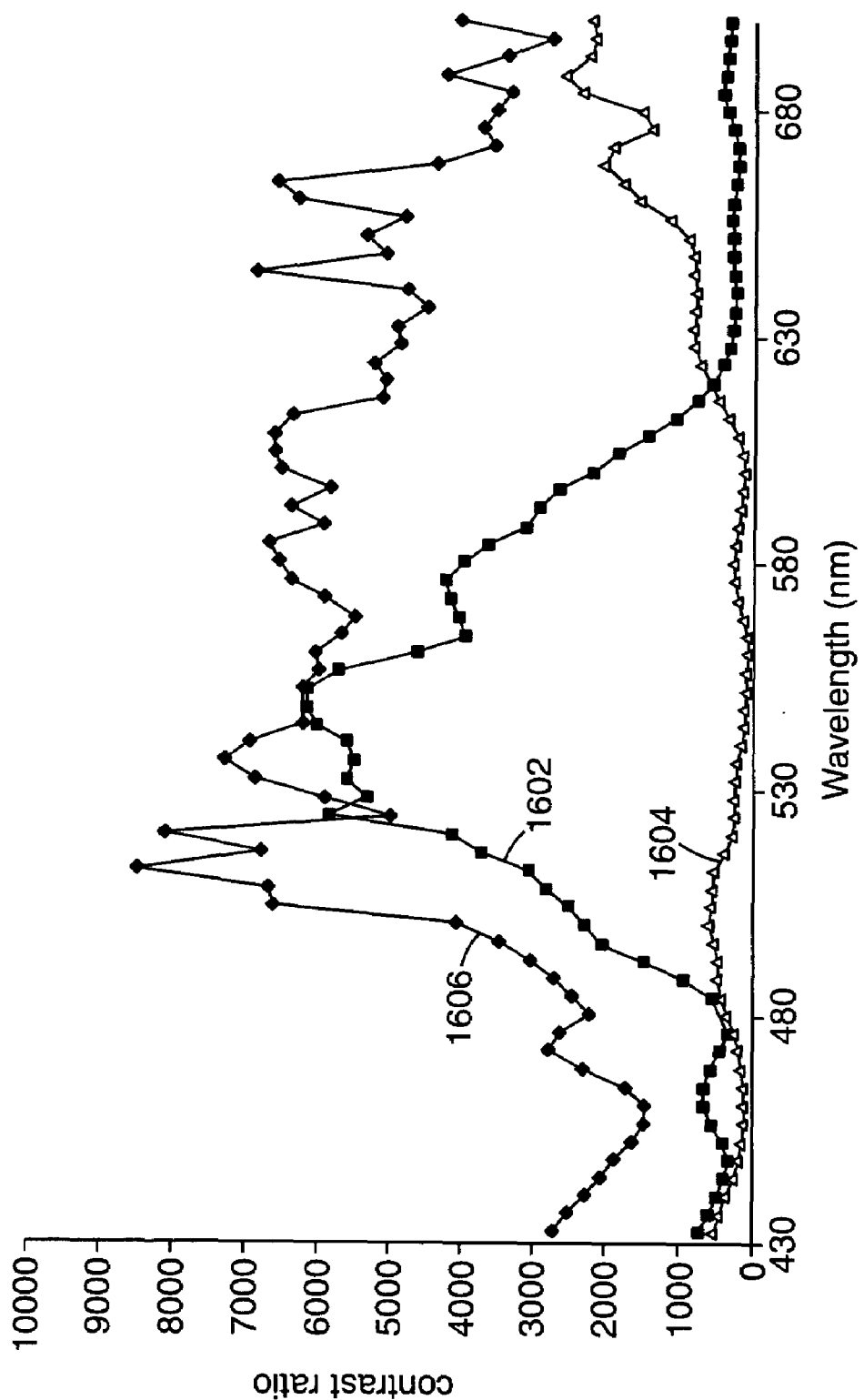
FIG. 16 presents a graph showing the contrast for sample films 1 and 2 of Example 3, and for a combination of sample films 1 and 2, as a function of wavelength.

The contrast ratio plot for this laminate PBS is shown in FIG. 16 as curve 1606. For comparison, curves 1602 and 1604 respectively show the contrast obtained from PBSs comprising single Films 1 and 2 respectively. As can be observed, the combination of film 1 and film 2 in the same PBS provides a higher contrast across the visible wavelength range than the two films provide individually. It should be noted that, due to the experimental characteristics of the equipment used to measure contrast, values of contrast ratio higher than about 4000 are subject to large errors in accuracy. Thus, for contrast values higher than about 4000, the absolute value of the contrast is not well known.

Figure 17:
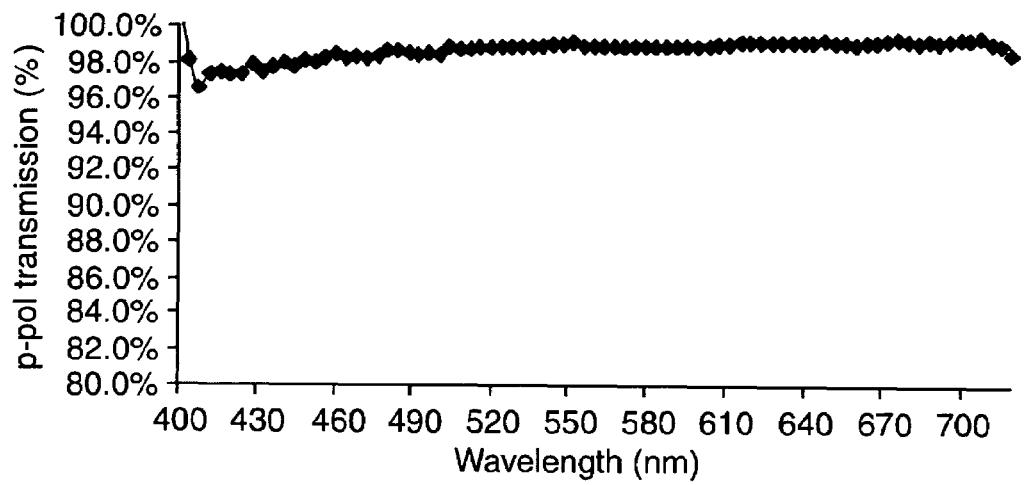
FIG. 17 presents a graph showing the transmission for a combination of sample films 3 and 4 of Example 3, as a function of wavelength.
Figure 18:
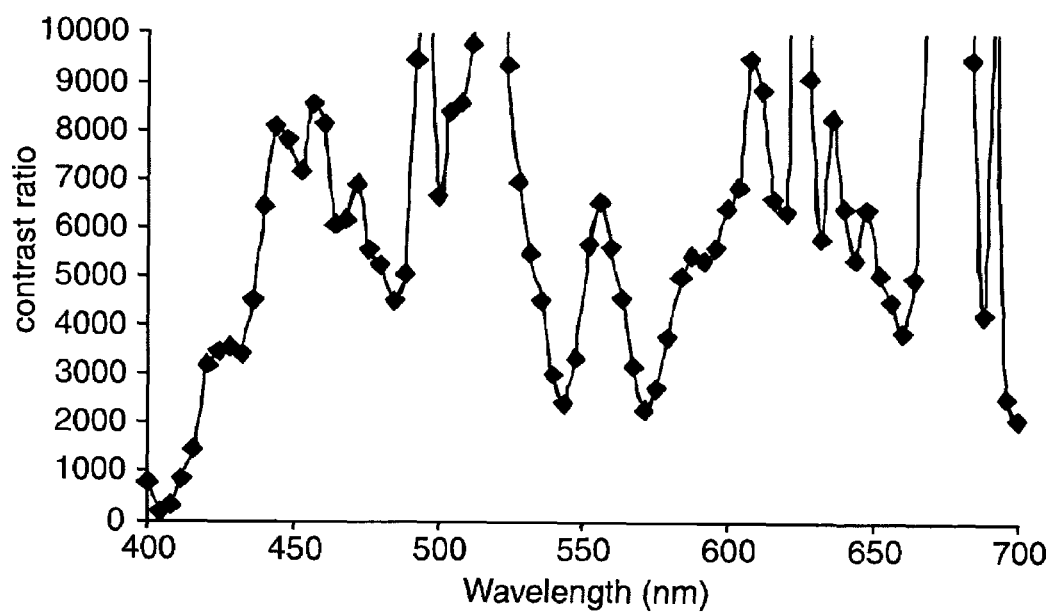
FIG. 18 presents a graph showing the contrast for a combination of sample films 3 and 4 of Example 3, as a function of wavelength.

Another laminate PBS was formed using films like Films 3 and 4. The p-polarized transmission spectrum for this example of dual film MOF PBS is shown in FIG. 17. The p-polarized transmission for this MOF PBS is high, in excess of 97% over the entire visible range (430 nm-700 nm). The contrast of the MOF PBS is also high, as is shown in FIG. 18. The minimum contrast in the blue region (428 nm-508 nm) is 3436:1, while it is 2289:1 in the green region (504-576 nm) and 2088:1 in the red region (600-700 nm).

The MOF PBSs described in Examples 1 and 3 are particularly suitable for use in the projection system 100 illustrated in FIG. 1, due to their high p-polarized transmission values and high contrast.

The present disclosure should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. A projection engine device, comprising:
a first polarizing beam splitter (PBS), the first PBS for substantial reflecting light incident along a first input direction in a first polarization state and substantially transmitting light incident in the first input direction in a second polarization state orthogonal to the first polarization state, the first PBS demonstrating an angularly dependent reflectivity for light in the second polarization state that is asymmetric about the first input direction and wherein the first PBS reflects less than 5% of light in the second polarization state when illuminated by light in the wavelength range from about 430 nm to about 700 nm and having an f-number of no more than f/2.5;
a second PBS positioned to receive light reflected by the first PBS;
a third PBS positioned to receive light transmitted through the first PBS;
a first imaging element configured and arranged to a) receive, as first incident light, at least a first portion of the light received by the second PBS from the first PBS; b) polarization modulate at least a portion of the first incident light from the first polarization state to the second polarization state or from the second polarization state to the first polarization state; and c) reflect the polarization modulated light back to the second PBS as first image light;
a second imaging element configured and arranged to a) receive, as second incident light, at least a first portion of the light received by the third PBS from the first PBS; b) polarization modulate at least a portion of the second incident light from the first polarization state to the second polarization state or from the second polarization state to the first polarization state; and c) reflect the polarization modulated light back to the third PBS as second image light; and
a combiner positioned to receive the first and second image light from the second and third PBSs, respectively.

2. The device of claim 1, wherein the reflectivity for light in the second polarization state is substantially flat as a function of incident angle for angles of incidence up to at least 5° on one side of the first input direction.

3. The device of claim 1, wherein the light reflected by the first PBS is incident generally on the second PBS along a second input direction and the second PBS demonstrates an angularly dependent reflectivity for light in the second polarization that is asymmetric about the second input direction.

4. The device of claim 3, wherein the reflectivity for light in the second polarization state is substantially flat as a function of incident angle for angles of incidence up to at least 5° on one side of the second input direction.

5. The device of claim 3, wherein off axis light in the second polarization state is incident on the first PBS at a first off-axis angle and is incident on the second PBS at a second off-axis angle the reflectivity for the light in the second polarization state being higher for incidence on the first PBS at the first off-axis angle than for incidence on the second PBS at the second off axis angle.

6. The device of claim 3, wherein off-axis light in the second polarization state is incident on the first PBS at a first off-axis angle and is incident on the second PBS at a second off-axis angle the reflectivity for the light in the second polarization state being lower for incidence on the first PBS at the first off axis angle than for incidence on the second PBS at the second off-axis angle.

7. The device of claim 1, wherein the first PBS is a Cartesian PBS.

8. The device of claim 7, wherein the first PBS comprises two covers and a multilayer polymeric film disposed between the two covers, the multilayer polymeric film being polarization sensitive.

9. The device of claim 8, wherein the multilayer polymeric film comprises a plurality of layers comprising a polyester comprising terephthalate monomer units.

10. The device of claim 9, wherein the multilayer polymeric film comprises alternating layers of first and second polymeric materials, the layer of first polymeric material being birefringent with a first in-plane refractive index, corresponding to a first in-plane direction, being different from a second in-plane refractive index, a difference between the first in-plane refractive index and a thickness refractive index being less than the difference between the second in-plane refractive index and the thickness refractive index.

11. The device of claim 10, wherein light in the second polarization state entering the first PBS along the input direction experiences an effective refractive index in the first layer of polymeric material arising from the second in-plane refractive index and the thickness refractive index, a magnitude of a difference between the effective refractive index and a refractive index of the second layer of polymeric material experienced by the light in the second polarization state being less than 0.01.

12. The device of claim 11, wherein the difference is less than 0.004.

13. The device of claim 12, wherein the difference is less than 0.002.

14. The device of claim 10, wherein the sign of the difference between the second in-plane refractive index of the first layer of polymeric material and the second-in-plane refractive index of the second layer of polymeric material at a wavelength above about 600 nm is different from the sign of the difference between the second in-plane refractive index of the first layer of polymeric material and the second-in-plane refractive index of the second layer of polymeric material at a wavelength below about 450 nm.

15. The device of claim 9, wherein the polyester comprises a homopolymer or copolymer of ethylene terephthalate.

16. The device of claim 8, wherein first PBS comprises two multilayer polymeric films disposed between the two covers.

17. The device of claim 7, wherein the second PBS is a Cartesian PBS.

18. The device of claim 17, wherein the second PBS comprises two covers and a multilayer polymeric film disposed between the two covers, the multilayer polymeric film being polarization sensitive.

19. The device of claim 18, wherein the multilayer polymeric film comprises a plurality of layers comprising a polyester comprising naphthalate monomer units.

20. The device of claim 19, wherein the polyester comprises a homopolymer or copolymer of ethylene naphthalate.

21. The device of claim 1, further comprising a third imaging element configured and arranged to a) receive, as third incident light, at least a second portion of the light received by the third PBS front the first PBS, light in the third incident light being in a color band different from a color band of the second incident light; b) polarization modulate at least a portion of the third incident light from the first polarization state to the second polarization state or from the second polarization state to the first polarization state; and c) reflect the polarization modulated light back to the third PBS as third image light.

22. The device of claim 1, further comprising a third imaging element configured and arranged to a) receive, as third incident light, at least a second portion of the light received by the second PBS from the first PBS, light in the third incident light being in a color band different from a color band of the first incident light; b) polarization modulate at least a portion of the third incident light from the first polarization state to the second polarization state or from the second polarization state to the first polarization state; and c) reflect the polarization modulated light back to the third PBS as third image light.

23. The device of claim 1, wherein the first PBS reflects at least 99% of light in the first polarization state when illuminated by light in the wavelength range from about 430 nm to about 700 nm and having an f-number of no more than f/2.5.

24. A projection engine device, comprising:
a first polarizing beam splitter (PBS), the first PBS for substantially reflecting light incident along a first input direction in a first polarization state and substantially transmitting light incident in the first input direction in a second polarization state orthogonal to the first polarization state, the first PBS demonstrating an angularly dependent reflectivity for light in the second polarization state that is asymmetric about the first input direction and wherein the first PBS reflects less than 5% of light in the second polarization state when illuminated by light in the wavelength range from about 430 nm to about 700 nm and having an f-number of no more than f/2.5;
at least a first imaging device configured and arranged to impose an image on light reflected by the first PBS;
at least a second imaging device configured and arranged to impose an image on light transmitted through the first PBS; and
a combining element disposed to combine image light received from the at least a first imaging device and the at least a second imaging device to form a combined image beam.

25. A device as recited in claim 24, further comprising a second PBS disposed to reflect light reflected by the first PBS to the first imaging device.

26. A device as recited in claim 25, wherein the light reflected from the first PBS to the second PBS reaches the second PBS propagating generally along a second input direction, the second PBS having an angularly dependent reflectivity for light in the second polarization state that is asymmetric about the second input direction.

27. A device as recited in claim 24, further comprising a third PBS disposed to receive light transmitted through the first PBS, wherein the at least a second imaging device comprises a second and a third imaging device, the second imaging device receiving light reflected by the third PBS and the third imaging device receiving light transmitted through the third PBS.

28. A device as recited in claim 27, wherein the light transmitted through the first PBS comprises light in at least first and second color bands, and further comprising a first polarization rotating element disposed between the first and third PBSs to rotate polarization of light in at least the first color band.

29. A device as recited in claim 28, further comprising a second polarization rotating element disposed between the third PBS and the combining element, the second polarization element rotating polarization of image light in one of the first and second color bands received from the third PBS.

30. A device as recited in claim 24, further comprising a light source capable of producing illumination light incident at the first PBS, along the first input direction.

31. A device as recited in claim 24, further comprising a projection lens unit disposed to project the combined image light from the combining element.

* * * * *

UNITED STATES PATENT AND TRADEMARK OFFICE
CERTIFICATE OF CORRECTION

PATENT NO. : 7,261,418 B2 Page 1 of 1
APPLICATION NO. : 10/987528
DATED : August 28, 2007
INVENTOR(S) : Jiaying Ma It is certified that error appears in the above-identified patent and that said Letters Patent is hereby corrected as shown below:

Title page, Column 1
Line 10, delete "6,447,120 B1" and insert -- 6,447,120 B2 --, therefor.

Column 15
Line 47, after "568" delete "m" and insert -- nm --, therefor.

Column 19
Line 59, in Claim 1, delete "substantial" and insert -- substantially --, therefor.

Column 20
Line 43, in Claim 5, delete "off axis" and insert -- off-axis --, therefor.
Line 46, in Claim 5, delete "angle" and insert -- angle, --, therefor.
Line 49, in Claim 5, delete "off axis" and insert -- off-axis --, therefor.
Line 53, in Claim 6, delete "angle" and insert -- angle, --, therefor.
Line 55, in Claim 6, delete "off axis" and insert -- off-axis --, therefor.

Column 21
Line 51, in Claim 21, delete "front" and insert -- from --, therefor.

Signed and Sealed this

Twenty-fifth Day of December, 2007

JON W. DUDAS
*Director of the United States Patent and Trademark Office*